US006486641B2

(12) United States Patent
Scoggins et al.

(10) Patent No.: US 6,486,641 B2
(45) Date of Patent: Nov. 26, 2002

(54) POWER REGULATION OF ELECTRICAL LOADS TO PROVIDE REDUCTION IN POWER CONSUMPTION

(75) Inventors: Robert L. Scoggins, Leland, NC (US); Anthony D. Sheaffer, Charlotte, NC (US); Michael A. Fulton, Charlotte, NC (US); James O. Crompton, Jr., Hendersonville, NC (US)

(73) Assignee: PowerTec International, Wilmington, NC (US)

( * ) Notice: Subject to any disclaimer, the term of this patent is extended or adjusted under 35 U.S.C. 154(b) by 0 days.

(21) Appl. No.: 09/871,838

(22) Filed: Jun. 1, 2001

(65) Prior Publication Data

US 2002/0034086 A1 Mar. 21, 2002

Related U.S. Application Data

(60) Provisional application No. 60/218,915, filed on Jul. 18, 2000, and provisional application No. 60/208,606, filed on Jun. 1, 2000.

(51) Int. Cl.[7] .................................................. H02J 3/12
(52) U.S. Cl. ....................... 323/257; 323/258; 323/260; 323/263; 323/301; 323/341; 323/342; 323/343
(58) Field of Search ................................ 323/232, 255, 323/256, 257, 258, 259, 260, 263, 301, 340, 341, 342, 343

(56) References Cited

U.S. PATENT DOCUMENTS

| 3,818,402 A | | 6/1974 | Golaskiet et al. ............ 336/147 |
|---|---|---|---|
| 4,023,090 A | * | 5/1977 | Kljucaricek ................. 323/342 |
| 4,405,894 A | | 9/1983 | Rice et al. ................... 323/340 |
| 4,417,181 A | | 11/1983 | Leale ....................... 315/209 R |
| 4,766,353 A | | 8/1988 | Burgess ...................... 315/324 |
| 4,965,508 A | | 10/1990 | Soan ........................... 323/239 |
| 4,972,124 A | | 11/1990 | Powers ........................ 315/219 |
| 5,225,741 A | | 7/1993 | Auld, Jr. et al. ............ 315/307 |
| 5,449,981 A | | 9/1995 | Auld, Jr. et al. ............ 315/308 |
| 5,512,801 A | | 4/1996 | Nilssen ........................ 315/209 |
| 5,608,295 A | | 3/1997 | Moisin ........................ 315/247 |
| 5,652,504 A | | 7/1997 | Bangerter ................... 323/239 |
| 5,874,809 A | | 2/1999 | Hagen ......................... 315/244 |
| 5,907,480 A | | 5/1999 | Salonen ....................... 363/21 |

FOREIGN PATENT DOCUMENTS

WO  WO 98/53648  11/1998  ........... H05B/41/70

* cited by examiner

*Primary Examiner*—Jeffrey Sterrett
(74) *Attorney, Agent, or Firm*—Merchant & Gould; Tim Tingkang Xia

(57) ABSTRACT

A power regulation system is coupled to an AC power source outputting an input voltage. The system has a first transformer to receive the input voltage and generate a control voltage. The system also has a second transformer that has a primary coil and a secondary coil. The primary coil and secondary coil of the second transformer are electromagnetically coupled to each other and so arranged that when the control voltage from the first transformer is applied to the primary coil, an output voltage is generated between a first end and a second end of the secondary coil, wherein the output voltage is substantially 180° out of phase from the input voltage so as to generate an effective voltage applied to the load, and wherein the effective voltage is less than the input voltage and substantially equals to the difference between the input voltage and the output voltage, resulting a reduction in power consumption of the load.

31 Claims, 14 Drawing Sheets

POWER REGULATION OF ELECTRICAL LOADS TO PROVIDE REDUCTION IN POWER CONSUMPTION

CROSS-REFERENCE TO RELATED PATENT APPLICATION

This application claims the benefit, pursuant to 35 U.S.C. § 120, of provisional U.S. patent application Ser. No. 60/208,606, filed Jun. 1, 2000 entitled "SYSTEM AND METHODS FOR CONTROL OF POWER CONSUMPTION OF LIGHTING CIRCUITS," and provisional U.S. patent application Ser. No. 60/218,915, filed Jul. 18, 2000 entitled "IMPROVED SYSTEM AND METHODS FOR CONTROL OF POWER CONSUMPTION OF LIGHTING CIRCUITS."

BACKGROUND OF THE INVENTION

1. Field of the Invention

This invention relates to a system for control of electrical power consumption. More particularly, this invention relates to a method and apparatus for control and regulation of electrical power and reduction of energy consumption of a load such as lights and motors.

2. The Prior Art

A variety of AC power regulating circuits are known in the art in which AC power to a load (e.g., fluorescent lamps, motors, etc.) is regulated. For example, a proper circuit can be used to dim lights by reducing amperage used by the lights, which reduces the power consumed and saves energy.

One type of prior art uses an autotransformer for changing the voltage on the load. In one application, the primary winding of the autotransfomer has some parallel shunt resistors and proper combination of switches to allow that the power supplied to the load is discretely changed. One problem related to this application is that the load is subjected to a series of stresses, which can cause damage to the load. In another application, autotransfomers with moving wiper contact arrangement are utilized. However, in the prior art, autotransfomers are often directly coupled to the load, which subjects autotransfomers to constant stresses.

Another type prior art uses relays in conjunction with an autotransformer for changing the voltage on the load. PCT Publication WO 98/53648 by Reverberi discloses a centralized power reducing device using an autotransformer and means of relays controlled by a logic unit.

Additionally, a common problem associated with the prior art is lacking of flexibility for a user to regulate power consumption according to location of the load and changing demand with time. For example, lighting demand in office area depends on whether it is a working day (normally Monday to Friday) or an off day (weekends and holidays). For any given day, the demand also depends on whether it is open hours or closed hours (e.g., night).

Thus, there is still a need for a new and improved power regulation system for better performance.

SUMMARY OF THE INVENTION

The above-noted disadvantages of the prior art are overcome by the present invention, which in one aspect is a power regulation system coupled to an AC power source outputting an input voltage between a first node and a second node. In a single phase system, the first node can be connected to a power path, and the second node can be connected to neutral or ground. Included in the system is a first transformer having a winding having a first end and a second end, wherein the first end is electrically coupled to the first node and the second end is electrically coupled to the second node to receive the input voltage, and a movable wiper arm having a wiper, an output node and a body therebetween, wherein the movable wiper arm is movable continuously between the second end and the first end of the winding so that a control voltage is generated between the output node and the second end within a range of from 0 volts to at least the input voltage. The system also has a second transformer that has a primary coil having a first end and a second end, wherein the first end is electrically coupled to the output node and the second end is electrically coupled to the second node to receive the control voltage from the first transformer, and a secondary coil having a first end and a second end, wherein the first end is electrically coupled to the first node. The system can be used in connection with a load having a first terminal and a second terminal can also be included in the system, wherein the first terminal is electrically connected to the second end of the second transformer and the second terminal is electrically coupled to the second node.

In one embodiment of the present invention, the primary coil and secondary coil are electromagnetically coupled to each other and so arranged that when the control voltage from the first transformer is applied to the first end and the second end of the primary coil, an output voltage is generated between the first end and the second end of the secondary coil, wherein the output voltage is substantially 180° out of phase from the input voltage so as to generate an effective voltage applied to the load, and wherein the effective voltage is less than the input voltage and substantially equals to the difference between the input voltage and the output voltage, resulting a reduction in power consumption of the load.

In another embodiment of the present invention, the system further includes a driver engaging the movable wiper arm through the body of the movable wiper arm, and a controller, in control communication with the driver, that causes the driver to move the movable wiper arm to a selected position between the second end and the first end of the winding, so that a control voltage with a selected value is generated between the output node and the second end of the winding.

In another aspect, the invention includes a power regulation system coupled to an AC power source being a three-phase or multi-phase system, each phase outputting an input voltage related to neutral, respectively. On each phase of the AC power source, the system includes a first transformer having a winding having a first end and a second end electrically coupled to the phase and neutral, respectively to receive the input voltage from the phase, and a movable wiper arm having a wiper, an output node and a body therebetween, wherein the movable wiper arm is movable continuously between the second end and the first end of the winding so that a control voltage is generated between the output node and the second end within a range of from 0 volts to at least the input voltage. The system also includes, on each phase, a second transformer having a primary coil having a first end and a second end, wherein the first end is electrically coupled to the output node and the second end is electrically coupled to neutral to receive the control voltage from the first transformer, and a secondary coil having a first end and a second end, wherein the first end is electrically coupled to the phase. The primary coil and secondary coil are electromagnetically coupled to each other and so arranged that when the control voltage from the first transformer is applied to the first end and the second end of the primary coil, an output voltage is generated between the first end and the second end of the secondary coil, and wherein the output voltage is substantially 180° out of phase from the input voltage so as to generate an effective voltage that is less than the input voltage and substantially equals to the difference between the input voltage and the output voltage.

In yet another aspect, the invention includes a power regulation system coupled to an input node for receiving an input voltage and coupled to an output node for outputting an output voltage different from the input voltage. The system has a first power path electrically coupling the input node and the output node to allow a current to flow therethrough. The system also has a power block, a control block and a safety block.

In one embodiment of the invention, the power block is on the first power path and electrically coupled to between the input node and the output node for regulating the current to flow therethrough and establishing the extent of the output voltage at the output node, the power block includes a first transformer electrically coupled in parallel with the first power path, the first transformer having an input node and an output node, and a second transformer electrically coupled in series with the first power path, the second transformer having a primary coil and a secondary coil with reversed polarities. The input node of the first transformer is electrically coupled to the first power path for receiving the input voltage, and the output node of the first transformer is electrically coupled to the primary coil of the second transformer for providing a control voltage to cause the secondary coil of the second transformer to generate an output voltage that can be different from the input voltage.

The control block is electrically coupled to the first power path and in control communication with the power block for providing operating current and setting a control voltage for the power block. The control block has a controller in control communication with the first transformer of the power block for setting the control voltage at a selected voltage.

Moreover, the safety block is electrically coupled to the first power path, the power block and the control block for providing surge protection. The safety block has a transient voltage suppression system electrically connected to the input node and positioned between the input node and the power block, and a shunt contactor electrically coupled between the primary coil of the second transformer of the power block.

Each of the power block, control block and safety block may include one or more additional components.

In yet another aspect, the invention is a method of regulating power to a load in conjunction with a power regulation system having a power path, a first transformer electrically coupled in parallel with the power path, the first transformer having an input node and an output node, and a second transformer electrically coupled in series with the power path, the second transformer having a primary coil and a secondary coil, wherein the input node of the first transformer is electrically coupled to the power path and the output node of the first transformer is electrically coupled to the primary coil of the second transformer. An input voltage is applied through the power path to the input node of the first transformer. A control voltage is then generated at the output node of the first transformer. The control voltage is applied to the primary coil of the second transformer to cause the secondary coil of the second transformer to generate an output voltage that is substantially 180° out of phase from the input voltage so as to generate an effective voltage applied to the load, wherein the effective voltage is less than the input voltage, resulting a reduction in power consumption of the load.

In a further aspect, the invention is a computer program product in a computer readable medium of instructions that can utilized in conjunction with a power regulation system. The computer program product includes instructions within the computer readable medium for operating a controller that is in communication with an user interface and a first transformer coupled to a power path for receiving an input voltage at an input node of the first transformer. The computer program product also includes instructions within the computer readable medium for permitting input to the controller by a user to generate a control signal responsive to the input. Additionally, the computer program product includes instructions within the computer readable medium for applying the control signal to the first transformer so that the first transformer generates a control voltage corresponding to the input at an output node of the first transformer, wherein the first transformer is electrically coupled with a second transformer that is coupled to the power path and has a primary coil coupled to the output node of the first transformer and a secondary coil so that when the control voltage is applied to the primary coil of the second transformer, the secondary coil of the second transformer generates an output voltage that is substantially 180° out of phase from the input voltage.

These and other aspects will become apparent from the following description of the preferred embodiment taken in conjunction with the following drawings, although variations and modifications may be effected without departing from the spirit and scope of the novel concepts of the disclosure.

BRIEF DESCRIPTION OF THE FIGURES OF THE DRAWINGS

FIG. 1A is a circuit diagram of a safety circuit used in one embodiment of the power regulation system as shown in FIG. 1.

DETAILED DESCRIPTION OF THE INVENTION

Figure 1:
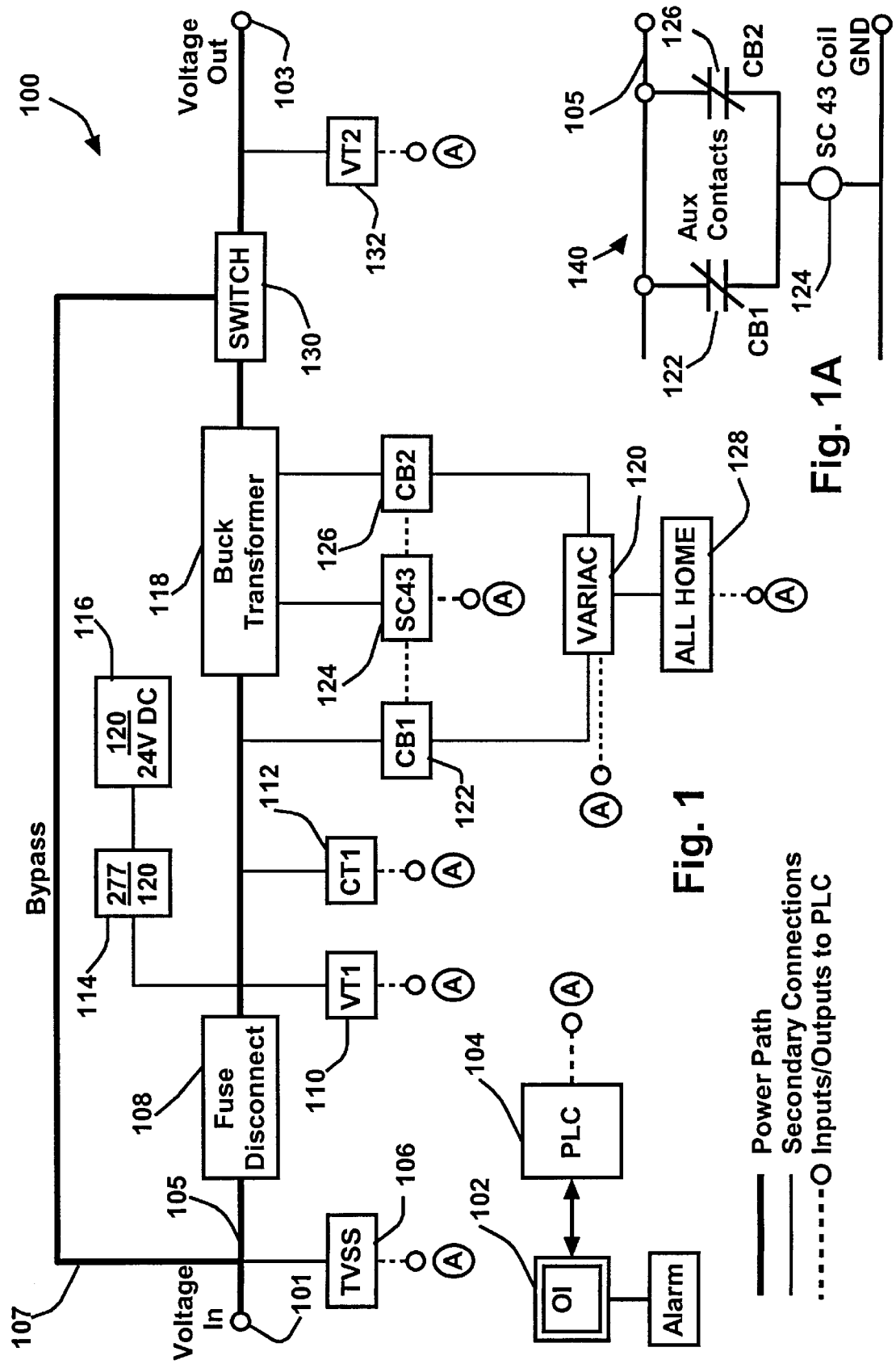
FIG. 1 is block diagram of one embodiment of a power regulation system in accordance with the present invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
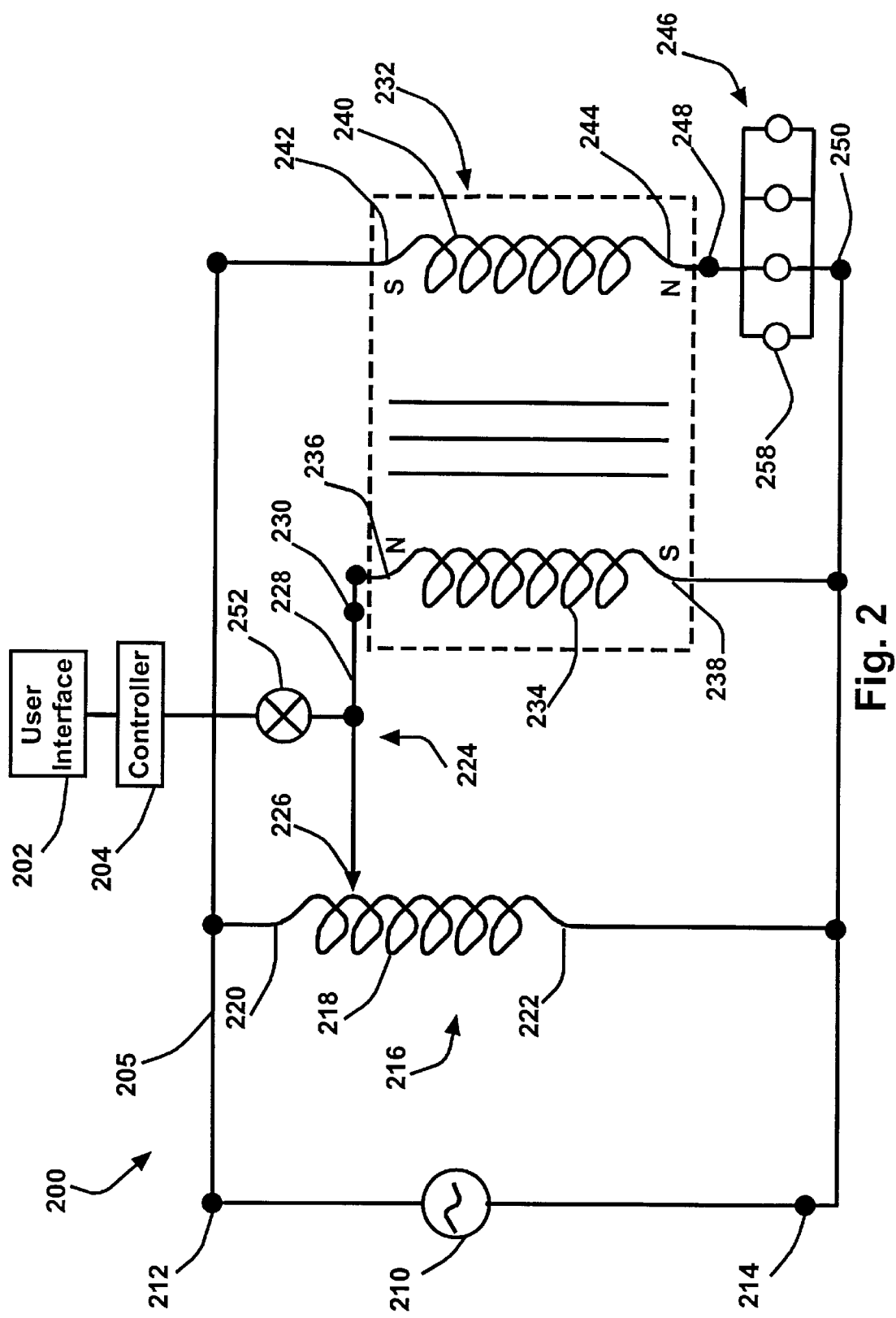
FIG. 2 is a block diagram of another embodiment of a power regulation system in accordance with the present invention.

Referring first to FIGS. 1 and 2, FIG. 1 is a block diagram that shows a power regulation system 100 coupled to an input node 101 for receiving an input voltage and coupled to an output node 103 for outputting an output voltage, and FIG. 2 is a block diagram that shows how such a power regulation system operates. As used in the description herein and throughout the claims that follow, the meaning of "voltage" is the electrical potential difference between a measurement point and a reference point. Unless the context clearly dictates otherwise, neutral is chosen as the reference point throughout the specification even if neutral is not shown in the drawings or explicitly identified. For example, an input voltage applied to the input node 101 should be understood as "an input voltage applied to the input node 101 and neutral," as known to people skilled in the art. Sometimes, ground can be chosen as neutral. The system 100 may be used in association with a single phase power system, a three-phase power system, or a multi-phase power system, although the power regulation system as shown in FIGS. 1 and 2 is in association with a single phase power system.

Referring now to FIG. 2, in one embodiment, the present invention relates to a power regulation system 200 coupled to an AC power source 210 outputting an input voltage between a first node 212 and a second node 214. The first node 212 is connected to a power path 205 and the second node 214 is chosen as neutral. The system 200 has a first transformer 216 and a second transformer 232 electrically coupled to each other. The first transformer 216 has a winding 218 having a first end 220 and a second end 222, wherein the first end 220 is electrically coupled to the first node 212 through the power path 205 and the second end 222 is electrically coupled to the second node 214 (i.e. neutral) to receive the input voltage. The first transformer 216 also has a movable wiper arm 224 having a wiper 226, an output node 230 and a body 228 therebetween, wherein the movable wiper arm 224 is movable continuously between the second end 222 and the first end 220 of the winding 218 so that a control voltage can be generated between the output node 230 and the second end 222 within a range of from 0 volts to at least the input voltage. For example, if the first transformer 216 is chosen to have a capacity of output voltage rated at approximately 117% of the input voltage and the input voltage is 277 volts to neutral (a typical value as used in the industry), the first transformer 216 can output a control voltage in the range of 0 to 323 volts. The zero volts control voltage corresponds to where the movable wiper arm 224 is positioned at the second end 222 of the winding 218, and the 323 volts control voltage corresponds to where the movable wiper arm 224 is positioned at the first end 220 of the winding 218.

The second transformer 232 has a primary coil 234 having a first end 236 and a second end 238, wherein the first end 236 is electrically coupled to the output node 230 and the second end 238 is electrically coupled to the second node 214 to receive the control voltage from the first transformer 216. The second transformer 232 also has a secondary coil 240 having a first end 242 and a second end 244, wherein the first end 242 is electrically coupled to the first node 212 through the power path 205. The primary coil 234 and secondary coil 240 have reversed polarities and are electromagnetically coupled to each other and so arranged that when the control voltage from the first transformer 216 is applied to the first end 236 and the second end 238 of the primary coil 234, an output voltage is generated between the first end 242 and the second end 244 of the secondary coil 240. Thus, in one embodiment as shown in FIG. 2, if the primary coil 234 has a polarity N at the first end 236 and S at the second end 238, the secondary coil 240 will have a polarity S at the first end 242 and N at the second end 244. Likewise, if the primary coil 234 has a polarity S at the first end 236 and N at the second end 238, the secondary coil 240 will have a polarity N at the first end 242 and S at the second end 244. The output voltage (Vo) is substantially 180° out of phase from the input voltage so as to generate between the first end 242 of the secondary coil 240 and the second node 214 an effective voltage (Ve) that is less than the input voltage (Vi) and substantially equals to the difference between the input voltage Vi and the output voltage Vo:

$$Ve = Vi - Vo.$$

Thus, if the system 200 is utilized in conjunction with a load 246, where the load 246 has a first terminal 248 being electrically coupled to the second end 244 of the second transformer 232 and a second terminal 250 being electrically coupled to neutral to receive the effective voltage. The power consumption of the load 246 is proportional to $(Ve)^2 = (Vi - Vo)^2$, which is less than the original power consumption of the load 246 that is proportional to $(Vi)^2$. The energy saved is proportional to: $1 - (Ve^2)/(Vo^2)$. The range of the output voltage Vo depends on the control voltage applied to the primary coil 234 of the second transformer 232 and the ratio of the winding of the primary coil 234 to the secondary coil 240 of the second transformer 232. In one embodiment, the ratio of the winding of the primary coil 234 to the secondary coil 240 of the second transformer 232 is chosen as 4:1 (four to one). Therefore, a maximum power reduction by the system 200 is achieved when a control voltage of 323 volts from the first transformer 216 results an output voltage of approximately 80 volts (=323/4 volts) at the secondary coil 240 of the second transformer 232, which will be defined as a 100% power reduction because the capacity of the winding 218 of the first transformer 216 is fully utilized. Conversely, a minimum power reduction by the system 200 is achieved when a control voltage of 0 volts from the first transformer 216 results an output voltage of 0 volts (=0/4 volts) at the secondary coil 240 of the second transformer 232, which will be defined as a 0% power reduction because the capacity of the winding 218 of the first transformer 216 is not utilized at all. Thus, the power reduction by the system 200 can be adjusted in a range of 0 to 100% of maximum power reduction. One feature of the invention as shown in FIG. 2 is to use the first transformer 216 to raise the input voltage so as to generate a large voltage drop across the secondary coil 240 of the second transformer 232, which can result an effective voltage significantly less than the input voltage.

The system 200 further includes a driver 252 mechanically engaging the movable wiper arm 224 through the body 228 of the movable wiper arm 224, and a controller 204, in control communication with the driver 252, causing the driver 252 to move the movable wiper arm 224 to a selected position between the second end 222 and the first end 220 of the winding 218, so that a control voltage with a selected value is generated between the output node 230 and the second end 222 of the winding 218. The driver 252 can be a motor, a mechanical device or a combination of them. Alternatively, a user may just manually move the movable wiper arm 224 to a selected position. The controller 204 is used to control the movement of the driver 252 to move the movable wiper arm 224 to a selected position between the second end 222 and the first end 220 of the winding 218. The controller 204 can be a digital processor or an analog processor. The controller 204 may be programmable. In one embodiment, the driver 252 is a motor, and the controller 204 is a programmable logic controller ("PLC"), which combination allows precise control of the movement of the movable wiper arm 224. There are various types of PLC available in the market, one example is an Allen Bradley programmable control logic processor which can be used to practice the present invention.

Additionally, the system 200 may also include a user interface 202 in communication with the controller 204. The user interface 202 is adapted to receive an input from a user and generate a control signal in response that is communicated to the controller 256 to cause the driver 252 to move the movable wiper arm 224 to a selected position and to display to the user information associated with the operation of the system 200. The user interface 202 can be a keyboard, a mouse, a graphic user interface, or any combination of them. The user interface 202 can be in communication with the controller 204 over a cable, a wireless network, a computer network such as the Internet or an intranet, or direct communication links. In one embodiment, the user interface 202 includes a touch screen panel. There are various types of touch screen available in the market, one example is an Allen Bradley, Panelview 550, which can be used to practice the present invention.

Now referring back to FIG. 1, the power regulation system 100 is shown to have several hardware elements to implement the invention as shown in FIG. 2 and discussed above. The power regulation system 100 includes a first power path 105 electrically coupling the input node 101 and the output node 103 to allow a current to flow therethrough, and several hardware components that are discussed in detail below. An input line voltage is applied to the input node 101 and neutral (not shown).

Variable Autotransformer 120

The power regulation system 100 includes a first transformer 120 and a second transformer 118 which are electrically coupled to each other and to the first power path 105 as illustrated in FIG. 2 and discussed above. In one embodiment, the first transformer 120 is a variable autotransformer and the second transformer 118 is a buck transformer (discussed in detail below). The variable autotransformer 120 has an autotransformer with a wiper arm that can move across the windings of the autotransformer, and a motor engaging the wiper arm. The variable autotransformer 120 outputs a variable voltage to the primary coil of the buck transformer 118. The output voltage of the variable autotransformer 120 is adjusted by the motor moving the wiper arm across the windings of the autotransformer. The motor movement is in turn controlled by a PLC 104 (discussed in detail below) that is in control communication with the motor and sends control signals to the motor. The control signals are based upon settings entered by a user for the desired output voltage through, for example, a user interface 102 (discussed in detail below).

The input of the variable autotransformer 120 is connected to incoming line voltage along the power path 105. The incoming line voltage is typically 480 volts phase to phase or 277 volts phase to neutral. Circuit breaker CB 1122 (discussed in detail below) provides overcurrent protection on input side of the variable autotransformer 120. For a single phase system, the incoming line voltage normally is 240V, although other voltages can be chosen as well.

The output voltage of the variable autotransformer 120 is rated at approximately 117% of the input line voltage, which is 323 volts if the incoming line voltage is 277 volts to neutral. The output voltage of the variable autotransformer 120 is the input voltage for the buck transformer 118. Thus, the variable autotransformer 120 is providing a control voltage in a range of 0 (at zero voltage reduction) to 323 volts (at full voltage reduction) to the primary coil of the buck transformer 118. Circuit breaker CB2 126 (discussed in detail below) provides overcurrent protection on the output side of the variable autotransformer 120.

Buck Transformer 118

In one embodiment, the buck transformer 118 is a toroidal transformer having a primary coil and a secondary coil, which have reversed polarities. The primary coil is rated at 323 volts. The primary coil is connected between the output of the variable autotransformer 120 and neutral (See primary coil 234 in FIG. 2). Thus, the primary coil of the buck transformer 118 is controlled by the output of the variable autotransformer 120.

In one embodiment, the ratio of the winding of the primary coil to the secondary coil of the buck transformer 118 is chosen as 4:1 (four to one). Thus, the 0 to 323 volts potential from the variable autotransformer 120 applied on the primary coil of the buck transformer 118 produces a 0 to 80 volts potential on the secondary coil of the buck transformer 118 due to the 4:1 ratio of the windings. Because the buck transformer 118 is a reverse polarity or buck, the voltage generated on the secondary coil of the buck transformer 118 is substantially 180° out of phase with the incoming line voltage. This phase difference produces a voltage drop up to 80 volts in line voltage, which results in a reduced voltage output to a load such as lights. The secondary coil of the buck transformer 118 is in line, or in series, with the power flow out to the load. Temperature switches (not shown) mounted in the transformers 118, 120 provide a signal to the PLC 104 if temperature associated with any of the transformers 118, 120 exceeds the design rating.

The buck transformer 118 and the variable autotransformer 120 constitute a power block that is electrically coupled to the first power path 105 and between the input node 101 and the output node 103 for regulating the current to flow therethrough. The power block may include additional components.

Power Supply 114

The system 100 has a first power supply device 114 electrically coupled to the first power path 105 for changing the input voltage to an AC voltage with a predetermined amplitude. In one embodiment, the first power supply device 114 is a transformer (not shown) having a primary coil and a secondary coil, the primary coil being electrically coupled to the first power path 105 for receiving the input voltage and the secondary coil outputting an AC voltage with a predetermined amplitude of substantially around 120 volts. In particular, the first power supply device 114 is a 277 to 120 volts transformer that supplies single phase 120 volts AC power for the system 100. The primary coil of the first power supply device 114 is fed from a line voltage, is fused at 7 amps and is rated for 500 VA. The first power supply device 114 provides single phase 120 volts AC power to other components of the system 100 such as the motor(s) associated with the variable autotransformer 120, fan(s), TVSS, and other components that operate or use 120 volts AC power as discussed below.

Power Supply 116

The system 100 has a second power supply device 116 electrically coupled to the secondary coil of the first power supply device 114 for changing the AC voltage with a predetermined amplitude of substantially around 120 volts to a DC voltage with a predetermined amplitude. In one embodiment, the second power supply device 116 has a transformer having a primary coil and a secondary coil, the primary coil being electrically coupled to the secondary coil of the first power supply device 114 for receiving an AC voltage with a predetermined amplitude of substantially around 120 volts and the secondary coil outputting a DC voltage with a predetermined amplitude of substantially around 24 DC volts. In particular, the second power supply device 116 is a 120 Vac to 24 Vdc power supply that provides power to other components of the system 100 such as the PLC 104, user interface 102, indicating lights, etc. The power supply device 116 is fused at 7 amps.

Input Voltage Transducer 110

The system 100 has an input voltage transducer 110 electrically coupled between the first power path 105 and the PLC 104 and positioned between the input node 101 and the buck transformer 118 for feeding input voltage signal to the PLC 104 for monitoring the input line voltage. In one embodiment, the input voltage transducer 110 includes a channel voltage transducer that is connected to the incoming line voltage for a single phase such as phase A. It provides an analog signal (0 to 10 volts) to the PLC 104 representing phase A input voltage scaled 0 to 300 volts.

Output Voltage Transducer 132

The system 100 has an output voltage transducer 132 electrically coupled between the first power path 105 and the PLC 104 and positioned between a switch 130 (discussed in detail below) and the output node 103 for feeding output voltage signal to the PLC 104 for monitoring the output voltage $V_{out}$ at the output node 103. The output voltage transducer 132 is a multi-channel output voltage transducer, each channel being capable of monitoring voltage in a phase independently. In one embodiment, the output voltage transducer 132 is a three channel voltage transducer in which each channel is connected to a corresponding phase of the output voltage $V_{out}$. The output voltage transducer 132 provides an analog signal (0 to 10 volts) to the PLC 104 based on $V_{out}$ of each phase (scaled 0 to 300 volts).

Current Transducer 112

The system 100 has a current transducer 112 electrically coupled between the first power path 105 and the PLC 104 for feeding current signal to the PLC 104 for monitoring the current passing through the first power path 105. In one embodiment, the current transducer 112 is a combination of a current transducer and a transformer. The current transducer 112 can be a multi-channel current transducer, each channel being capable of monitoring current in a phase independently. In one embodiment, the current transducer 112 includes a three channel current transducer that monitors each phase current independently. Alternatively, it can be used to monitor a single phase current as shown in FIG. 1. The current transducer 112 provides a 1 to 5 volts signal to the PLC 104 for each phase's current.

User Interface 102

The system 100 has a user interface 102 that allows a user, among other things, to control, program, and observe the operation of the system 100. In one embodiment, the user interface 102 includes a touchscreen menu that provides access to several different screens. Each screen provides a setting that include icons, each corresponding to a control signal that is communicated to the PLC 104 to cause the system 100 to perform a predetermined operation, and displays, each displaying information associated with the operation of the system 100. The user interface 102 provides choices of auto mode or manual mode to a user. The user can enter daily or weekly settings in the auto mode or can manipulate the system 100 in the manual mode. The user interface 102 communicates with the PLC 104.

PLC 104

The system 100 has a controller 104 in control communication at least with the first transformer 120 for setting the control voltage at a selected voltage. In fact, the controller 104 controls almost all operations of the system 100, whether in manual or auto mode. In one embodiment, the controller 104 is a PLC. In manual mode, a user enters a desired setting into the PLC 104 through the user interface 102 and then the PLC 104 initiates the voltage change. The output voltage can be lowered/raised from 0 to 100% in term of voltage reduction setting on any one phase or all three phases if the system 100 is used in conjunction with a three-phase power source. The voltage output to the load will remain there until the user manually changes it or the system 100 is changed back to auto mode. In auto mode, operation of the system 100 is based on predetermined values entered into the system 100 by the user. The settings can be entered based on Daily or Weekly settings. When the Daily selection is made, up to seven different settings can be programmed into the system 100 for each day, where each day can have different settings. When the Weekly selection is made, seven different settings can be entered for each day, where the settings are the same for every day of the week. More functions of the PLC 104 will be discussed below.

The PLC 104, user interface 102, current transducer 112, input voltage transducer 110, output voltage transducer 132, second power supply device 116, and first power supply device 114 constitute a control block that is electrically coupled to the first power path 105 and in control communication with the power block for providing operating current and setting a control voltage for the power block at a selected voltage.

Bypass Power Path 107

The system 100 has a second power path, or a bypass power path, 107 that is electrically coupling the input node 101 and the output node 103, wherein the second power path 107 is in parallel with the first power path 105 to provide an alternative path for the current passing through.

Relay Device 128

The system 100 has a relay device 128 that is electrically coupled between the variable autotransformer 120 and the PLC 104 for receiving a DC signal from the PLC 104 during a normal operation of the system and providing an AC voltage to the variable autotransformer 120 during an abnormal operation of the system. In one embodiment of the present invention, the relay device 128 includes an All Home Relay. In any alarm condition, i.e., an abnormal operation, the All Home Relay provides 120 Vac signal to motors of the variable autotransformer 120 through normally closed contacts. The PLC 104 provides a 24 Vdc signal to the relay coil during normal operation of the system 100, which prevents 120 Vac signal from being applied to the motors. Upon an alarm condition or controller failure, the 24 Vdc signal is dropped and the relay 128 is de-energized and normally closed contacts provide 120 Vac signal to motors of the variable autotransformer 120 to drive them to the home position (a non-conducting, safe state). Once the alarm condition is cleared, and the variable autotransformer(s) 120 go home, the relay 128 is energized again and power is removed from the motors. In an alarm condition, the variable autotransformer(s) 120 are sent home to minimize the potential of hazardous voltages developing across the terminals of the variable autotransformer 120 resulting in equipment failure or fire.

The alarm capability of the system 100 will be discussed in detail below.

Shunt Contactor 124

The system 100 has a shunt contactor 124 electrically coupled between the two ends of the primary coil of the buck transformer 118. As shown in FIG. 1A, the shunt contactor 124 forms an effective safety circuit 140 with a first circuit breaker 122 ("CB1") and a second circuit breaker 126 ("CB2") (both discussed further below), where CB1 and CB2 both connected to the power path 105 in parallel, and connected to the shunt contactor 124 in series. A large voltage (1000 volts dc) can develop across the primary coil of the buck transformer 118 and the terminals of the variable autotransformer 120 if CB1 or CB2 trips. The shunt contactor 124 prevents the voltage from being induced and minimizes the potential of equipment failure or fire. The shunt contactor 124 in turn connects to neutral. The shunt contactor 124 provides a shunt across the primary coil of the buck transformer 118 if either CB1 or CB2 trips. A current loop is established across the primary coil of the buck transformer 118 through the shunt contactor 124. Each circuit breaker, CB1 or CB2, has an auxiliary trip which energizes the shunt contactor 124 when the circuit breaker trips. The shunt contactor 124 has an auxiliary contact which provides a signal to the PLC 104 when it is actuated. The PLC 104 sends the variable autotransformer 120 to the home position, or non conducting state.

Circuit Breaker 122

The system 100 has a first circuit breaker 124 ("CB1") that is electrically coupled between the first power path 105 and input node 121 of the variable autotransformer 120. CB1 provides overcurrent protection for the input of the variable autotransformer 120 and is rated at 125% of the input current of the variable autotransformer 120. In one embodiment, CB1 has auxiliary contact(s). If CB2 trips, it's auxiliary contact provides line voltage to the shunt contactor 124, which then shorts th primary coil of the buck transformer 118 and the output of the variable autotransformer 120.

Circuit Breaker 126

The system 100 includes a second circuit breaker 126 ("CB2") electrically coupled between the output node 123 of the variable autotransformer 120 and the primary coil of the buck transformer 118. CB2 provides overcurrent protection for the output of the variable autotransformer 120 and is rated at 125% of the output current of the variable autotransformer 120. In one embodiment, CB2 has auxiliary contact (s). If CB2 trips, it's auxiliary contact provides line voltage to the shunt contactor 124, which shorts the primary coil of the buck transformer 118 and the output of the variable autotransformer 120.

Operate/Bypass Switch 130

The system 100 has a switch 130 operatively coupled to the first power path 105 and the second power path 107 for selectively allowing the current to flow therethrough one of the first power path 105 and the second power path 107. In one embodiment, the switch 130 is a switch that has a first, a second and a third operative positions corresponding to an auto, bypass, or off mode, respectively and allows operation of the system 100 in only one mode at a time.

When the switch 130 is selected to be on the first operative position corresponding to the auto mode, the switch 130 allows the current to flow therethrough the first power path 105, the power block and the switch 130 so that an output voltage different from the input voltage is generated between the output node 103 and neutral.

When the switch 130 is selected to be on the second operative position corresponding to the bypass mode of the system, the switch 130 allows the current to flow therethrough the second power path 107 and the switch 130 so that an output voltage substantially identical to the input voltage is generated between the output node 103 and neutral.

When the switch 130 is selected to be on the third operative position corresponding to the off mode, the switch 130 disallows the current to flow therethrough either of the first power path 105 and the second power path 107 so that no output voltage is generated between the output node 103 and neutral. However, the system 100 may be energized up to the switch 130.

Switch 130 allows operation of the system 100 in only one mode at a time. Interlocks (not shown) of the switch 130 prevent hazardous conditions which could arise if certain modes of operation were operated simultaneously.

Fused Device 108

The system 100 has a fusing device 108 positioned on the first power path 105 between the input node 101 and the power block, the fusing device 108 having a threshold of current at which the fusing device 108 disconnects the system 100 from the input node 101. In one embodiment, the fusing device 108 is a fused disconnect switch that provides primary over-current protection to the system 100. The fused disconnect switch 108 is sized at 125% of the rated current of the system 100. The fused disconnect switch 108 has an enclosure door handle (not shown) that is attached to the fused disconnect and can be used to turn the system 100 on or off. The door handle is also equipped with a mechanical interlock that must be defeated to open the enclosure when the system 100 is in operation.

TVSS 106

The system 100 has a transient voltage suppression system ("TVSS") 106 that is electrically connected to the input node 101 and input side of the fused device 108. Incoming voltage spikes caused by lightning, utility problems, etc., will be suppressed by TVSS 106 to prevent damage to the PLC 104 and other components of the system 100 as well as to the load.

Bypass Power Path 107, TVSS 106, Fused Device 108, Operate/Bypass Switch 130, Circuit Breaker 126, Circuit Breaker 122, Shunt Contactor 124, and Relay Device 128 constitute a safety block that is electrically coupled to the first power path 105, the power block and the control block for providing surge protection and preventing system failure.

Figure 3:
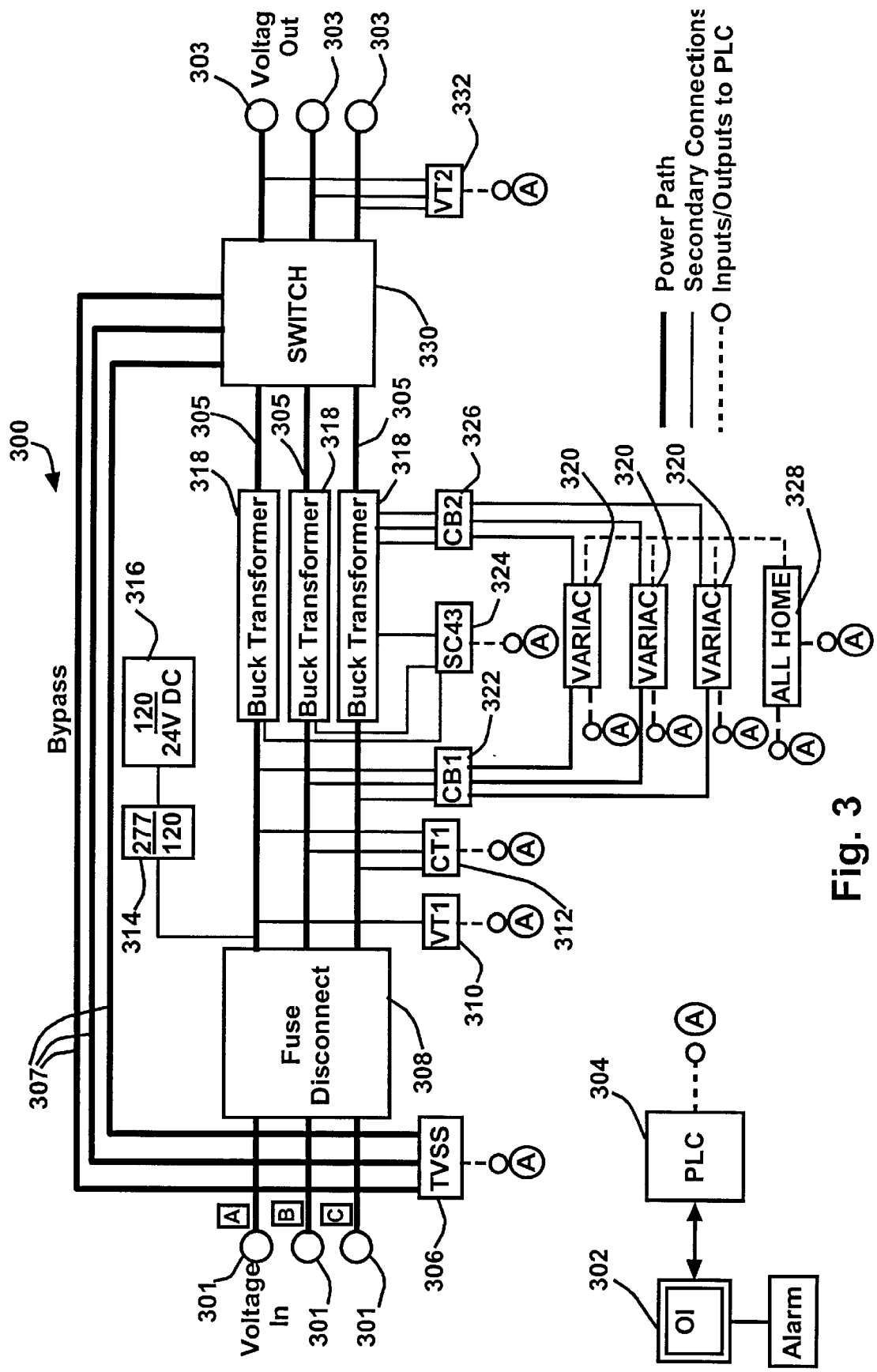
FIG. 3 is a block diagram of yet another embodiment of a power regulation system in accordance with the present invention.

While the invention is illustrated in FIGS. 1 and 2 in conjunction with a single phase power system, the invention can be used as well in a multi-phase system such as a three phase system. Referring now to FIG. 3, there is shown a block diagram of a power regulation system 300 in conjunction with a three phase power source. Three phases A, B, and C each provides an input voltage relative to neutral (not shown) through an input node 301, respectively, to a power path 305. For each phase, a buck transformer 318 and the variable autotransformer 320 are paired to each other (as shown in FIG. 2 and discussed above) and electrically coupled to the power path 305 for regulating the current to flow therethrough and providing at an output node 303 an output voltage. A PLC 304 is in control communication with the variable autotransformer 320. A user interface 302 communicates with the PLC 304 to allow a user, among other things, to control, program and observe the operation of the system 300. TVSS 306 is connected to the input side of a fuse device 308 to suppress unwanted incoming voltage spikes. The fuse device 308 is in series with the buck transformer 318 and positioned between the input nodes 301 and the buck transformer 318 to provide primary overcurrent protection to the system 300. A first power supply device 314 is electrically coupled to the power path 305 and provides single phase 120 volts AC power to other components of the system 300 that operate or use 120 volts AC power. A second power supply device 316 is electrically coupled to the first power supply device 314 and provides 24 volts DC power to other components of the system 300 that operate or use 24 volts DC power. An input voltage transducer 310 is electrically coupled between the power path 305 and the PLC 304 and positioned between the input nodes 301 and the buck transformers 318 for feeding input voltage signal to the PLC 304 for monitoring the input line voltage for a single phase. A current transducer 312 is electrically coupled between the power path 305 and the PLC 304 for feeding current signal to the PLC 304 for monitoring the current passing through the power path 305. The current transducer 312 is a three channel current transducer that monitors each phase current independently. Second power paths, or bypass power paths, 307 are electrically coupling the input nodes 301 and the output nodes 303 and in parallel with the power paths 305 to provide an alternative path for the current passing through for each phase, respectively. A switch 330 is operatively coupled to the power paths 305 and the bypass power paths 307 for in each phase selectively allowing the current to flow therethrough one of the power paths 305 and the bypass power paths 307. The switch 330 is a switch that has a first, a second and a third operative positions corresponding to an auto, bypass, or off mode, respectively and allows operation in only one mode at a time. An output voltage transducer 332 is electrically coupled between the power paths 305 and the PLC 304 and positioned between the switch 330 and the output nodes 303 for feeding output voltage signal to the PLC 304 for monitoring the output voltage in each phase independently. A relay device 328 is electrically coupled between the variable autotransformers 320 and the PLC 304 for receiving a DC signal from the PLC 104 during a normal operation of the system 300 and providing an AC voltage to all of the variable autotransformers 320 during an abnormal operation of the system 300. In one embodiment of the present invention, the relay device 328 includes an All Home Relay that can send all of the variable autotransformers 320 home during any alarm or abnormal condition. A shunt contactor 324 is electrically coupled across the primary coil of each buck transformer 318 to prevent the voltage from being induced and minimizes the potential of equipment failure or fire. A first circuit breaker 322 ("CB1") is electrically coupled between the power paths 305 and inputs of the variable autotransformers 320 to provide overcurrent protection for the input of the variable autotransformers 320. A second circuit breaker 226 ("CB2") is electrically coupled between outputs of the variable autotransformers 320 and the primary coils of the buck transformers 318, respectively, to provide overcurrent protection for the outputs of the variable autotransformers 320. In one embodiment of the present invention, each component of the system 300 has a counterpart in the system 100 shown in FIG. 1. Details including functionality and structure for each component of the system 300 thus can be found in above discussion related to the system 100.

Figure 4:
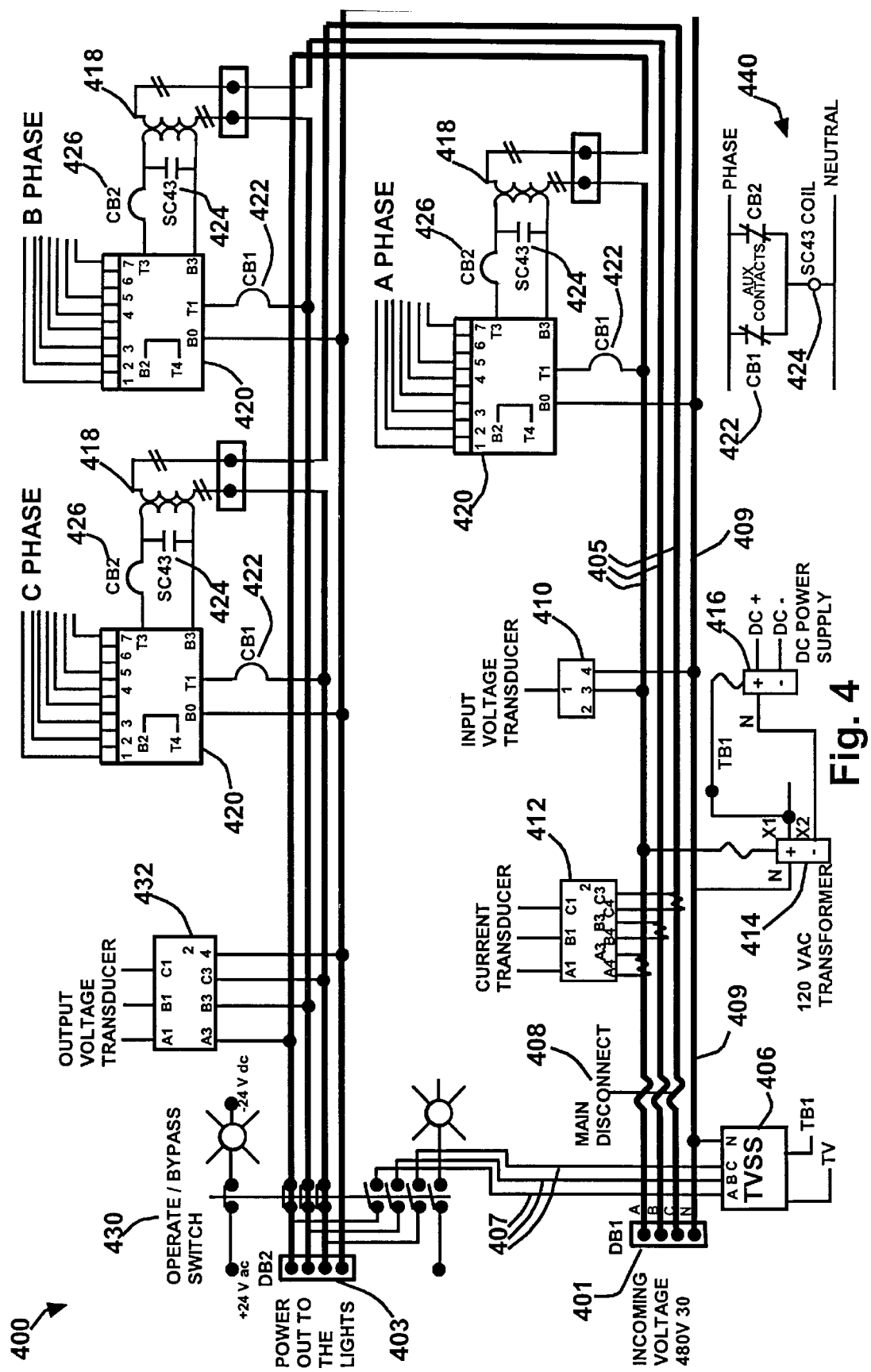
FIG. 4 is a detailed circuit diagram illustrating one embodiment of the power regulation system as shown in FIG. 3 in accordance with the present invention.

Referring now to FIG. 4, there is shown a detailed circuit diagram illustrating a power regulation system 400 similar to the power regulation system 300 of FIG. 3. Three phases A, B, and C each provides an input voltage related to neutral or neutral line 409 through an input node 401, respectively, to a power path 405. For each phase, a buck transformer 418 and the variable autotransformer 420 are paired to each other and electrically coupled to the power path 405 for regulating the current to flow therethrough and providing at an output node 503 an output voltage. Each phase can be regulated independently, and the output voltage for one phase can be different from that of the other phases, which allows a user to regulate the power consumption according to the location of a load, in addition to the capability of regulating the power consumption according to time. For example, if phase A provides power to a load in area one such as hallway, phase B provides power to a load in area two such as storage room, and phase C provides power to a load in area three such as office, areas one, two and three would require different lighting intensties. Area two can afford more power reduction, area one can afford some power reduction, and area three would like to have normal power supply during office hours but can afford power reduction when office is closed. The system 400 allows a user to meet these needs because each of phases A, B, and C can be regulated independently.

A PLC (not shown) is in control communication with the variable autotransformers 420. A user interface (not shown) communicates with the PLC to allow a user, among other things, to control, program and observe the operation of the system 400. TVSS 406 is connected to the input side of a fuse device 408 to suppress unwanted incoming voltage spikes. The fuse device 408 is in series with the buck transformers 418 and positioned between the input nodes 401 and the buck transformers 418 to provide primary over-current protection to the system 400. A first power supply device 414 is electrically coupled to the power path 405 and provides single phase 120 volts AC power to other components of the system 400 that operate or use 120 volts AC power. A second power supply device 416 is electrically coupled to the first power supply device 414 and provides 24 volts DC power to other components of the system 400 that operate or use 24 volts DC power. An input voltage transducer 410 is electrically coupled between the power path 405 and the PLC and positioned between the input nodes 401 and the buck transformers 418 for feeding input voltage signal to the PLC for monitoring the input line voltage for a single phase, such as phase A as shown in FIG. 4. A current transducer 412 is electrically coupled between the power paths 405 and the PLC for feeding current signal to the PLC for monitoring the current passing through each of the power paths 405. Second power paths, or bypass power paths, 407 are electrically coupling the input nodes 401 and the output nodes 403 and in parallel with the power paths 405 to provide an alternative path for the current passing through for each phase, respectively. A switch 430 is operatively coupled to the power paths 405 and the bypass power paths 407 for in each phase selectively allowing the current to flow therethrough one of the power paths 405 and the bypass power paths 407. The switch 430 is a switch that has a first, a second and a third operative positions corresponding to an auto, bypass, or off mode, respectively and allows operation in only one mode at a time. An output voltage transducer 432 is electrically coupled between the power paths 405 and the PLC and positioned between the switch 430 and the buck transformers 418 for feeding output voltage signal to the PLC for monitoring the output voltage in each phase independently. A relay device (not shown) is electrically coupled between the variable autotransformers 420 and the PLC for receiving a DC signal from the PLC during a normal operation of the system 400 and providing an AC voltage to at least one of the variable autotransformers 420 during an abnormal operation of the system 400. A shunt contactor 424 is electrically coupled across the primary coil of each buck transformer 418 to prevent the voltage from being induced and minimizes the potential of equipment failure or fire. A first circuit breaker 422 ("CB1") is electrically coupled between each of the power paths 405 and each of inputs of the variable autotransformers 420 to provide overcurrent protection for the input of the variable autotransformers 420, respectively. A second circuit breaker 426 ("CB2") is electrically coupled between each of outputs of the variable autotransformers 420 and each of the primary coils of the buck transformers 418, respectively, to provide overcurrent protection for the outputs of the variable autotransformers 420. The insert shows how CB1, CB2 and shunt contactor 424 form a protective circuit 440. In one embodiment of the present invention, each component of the system 400 has a counterpart in the system 300 shown in FIG. 3. Details including functionality and structure for each component of the system 400 thus can be found in above discussion related to the system 300.

Figure 5:
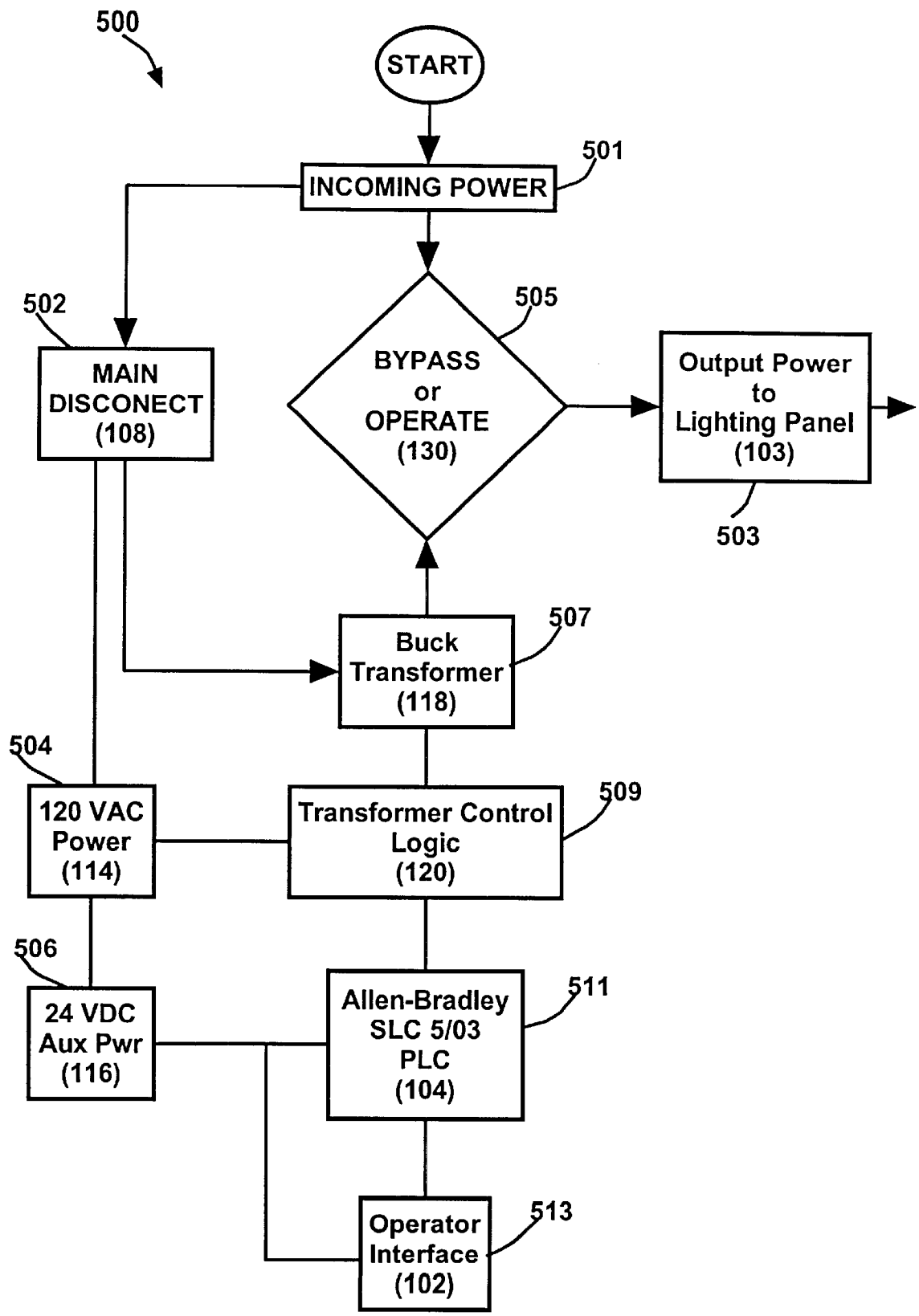
FIG. 5 is a logic diagram of one embodiment of each of the power regulation systems as shown in FIGS. 1, 2, 3 and 4 in accordance with the present invention.

Referring now to FIG. 5, there is shown a logic diagram 500 illustrating how a power regulation system of the present invention such as system 100 in FIG. 1, system 200 in FIG. 2, system 300 in FIG. 3 and/or system 400 in FIG. 4 operates. For certainty, system 100 as shown in FIG. 1 will be used in conjunction with FIG. 5 as an example. At step 501, incoming power or voltage comes into system 100 through input node 101 and neutral (not shown). Incoming power passes main disconnect 108 at step 502 to a first power supply device 114 for changing the incoming voltage to a single phase 120 volts AC power to power other components of the system. At step 506, a second power supply device 116 receives 120 volts AC power from the first power supply device 114 and changes it into a 24 volts DC power to power other components of the system.

At step 505, a user decides whether to operate the system 100 by utilizing the switch 130. If no, i.e. the user chooses bypass mode, the incoming power directly goes to the output node 103 at step 503 and then out to a load such as lighting circuits or panel(s). If yes, incoming voltage is applied to the input of a variable autotransformer 120 at step 509. The output of the variable autotransformer 120 is applied to the primary coil of a buck transformer 118 at step 507, which generates a voltage drop across the secondary coil (buck mode) of the transformer that decreases the output voltage to a load, resulting a reduced power consumption by the load when the reduced line voltage is applied to the load at step 503. A PLC 104 controls the variable autotransformer movement depending on the desired voltage output to the load at step 511. The user uses an operator or user interface 102 to communicate with the PLC 104 and provide inputs to the PLC 104 at step 513.

In one embodiment, the user interface 102 includes a touch screen panel 600 as shown in FIGS. 6–14 that allows for local control while remote control can be accomplished using many different communication links. The state of the system 100, Auto or Manual, is controlled from the user interface 102. In Auto, the system 100 operates off of daily or weekly settings pre-programmed via the user interface 102. In Manual, the user enters the desired settings and then initiates the changes via the user interface 102.

Additionally, the user interface 102 provides a platform for monitoring the state of the system. Current transformers and transducers, and voltage transducers provide monitoring and feedback capabilities to the PLC 104 for individual phase control. For each individual phase, the voltage out to the lights at the output node 103, $V_{out}$, is constantly monitored by the voltage transducer(s) 132. The voltage transducer(s) 132 provide an input to the PLC 104. The desired percentage of voltage reduction entered by the user, whether in Manual or a daily or weekly setting, results in a voltage setpoint for $V_{out}$. When $V_{out}$ is not equal to the voltage setpoint within a specified deadband, the PLC 104 provides a signal to the motor of the variable autotransformer 120 to increase or decrease $V_{out}$ to meet the setpoint. In Auto, the system 100 will maintain $V_{out}$ within the specified setpoint limits, usually ±2 volts. In Manual, the user enters the desired reduction setpoint, initiates the change, and the system 100 will move to and then maintain $V_{out}$ within the setpoint limits.

In Auto, the system 100 automatically goes to the desired $V_{out}$, or energy reduction, when the time and date match that entered by the user. In one embodiment, the PLC is programmed to have a Restrike feature that is active when the system 100 is in Auto mode. The Restrike feature prevents the starting of a load such as lights at an inappropriate voltage. The Restrike feature senses a sudden increase in current, such as a bank of lights being turned on, and increases $V_{out}$ to a preset value. There are three user-entered values in the System Control screen associated with Restrike. The delta, or change in current which enables Restrike is the Restrike current. The Restrike voltage is the level to which $V_{out}$ will increase to. Restrike time is the time, in seconds, that $V_{out}$ will stay at the Restrike voltage before returning to the already programmed daily or weekly setting.

The PLC 104 continually monitors and controls the operation of the system 100. The user interface 102 allows the user to enter parameters which setup the control boundaries for the system 100. Panel 600 provides a plurality of settings for a user to choose and set proper parameters, which are discussed in detail below.

Figure 6:
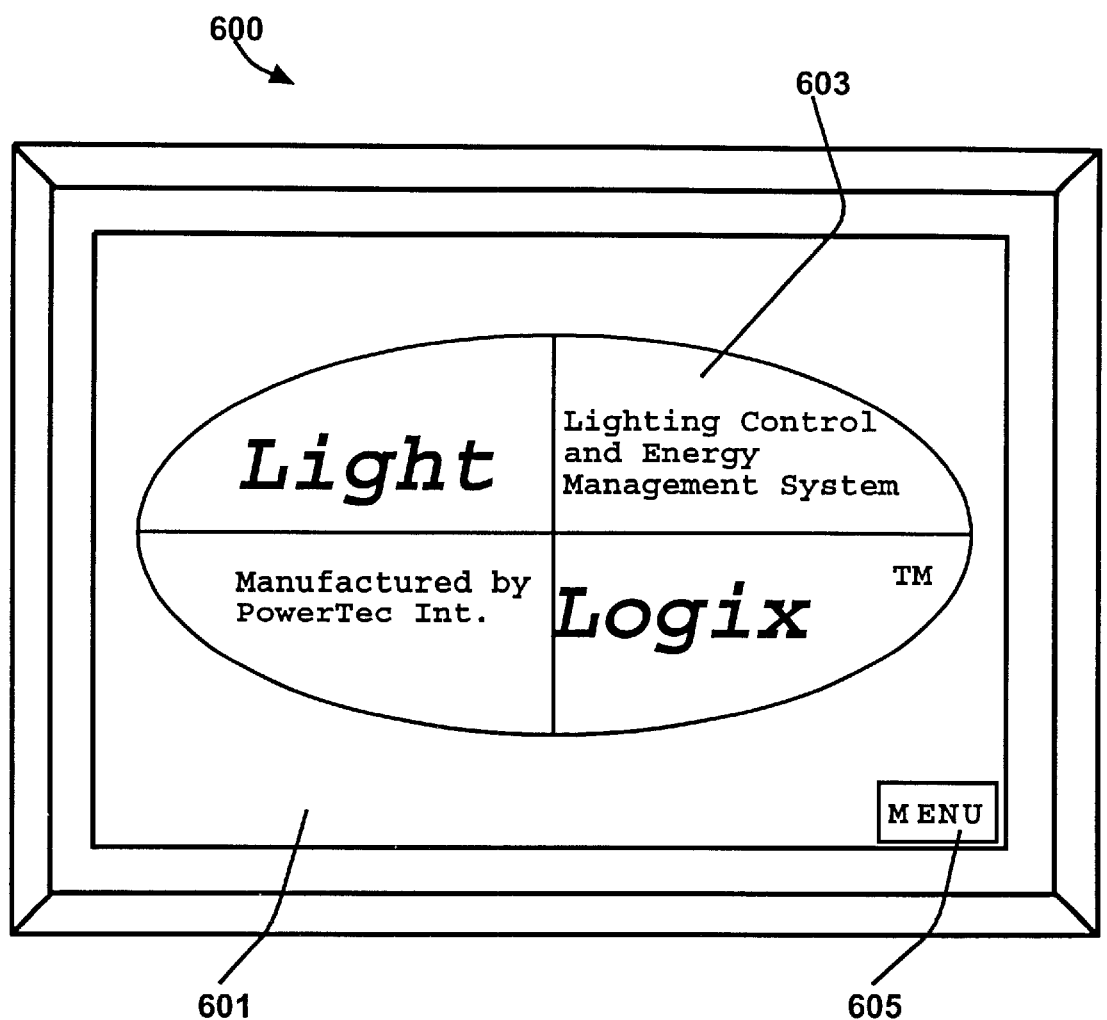
FIGS. 6 through 14 are displays each illustrating a setting for one embodiment of a power regulation system in accordance with the present invention.

Referring now to FIG. 6, panel 600 shows a display 601. The display 601 includes a content 603 to provide information associated with the display 601, here as a logo screen for PowerTec International, the assignee of the invention, and an icon 605. The display 601 is displayed when the system 100 is initialized, and any time it is selected from the main menu (discussed below). Each display may contain one or more icons. When an icon is selected by a user, a new display will appear. For the embodiment shown here, each icon is a softkey. Selecting the icon 605 presents a new display 701, Main Menu, as shown in FIG. 7.

Figure 7:
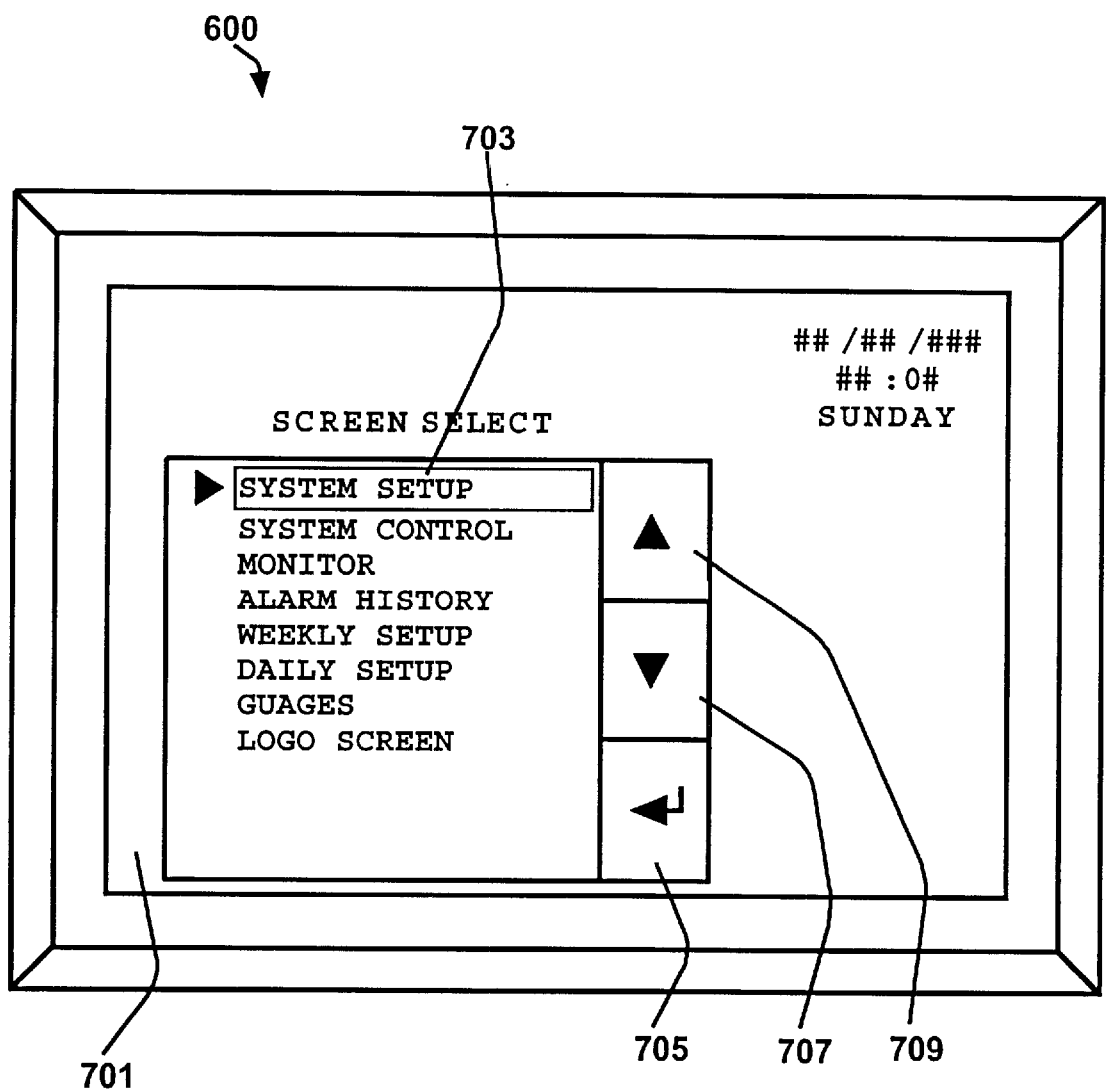

Referring now to FIG. 7, panel 600 shows a display 701 as a Main Menu screen or display. The display 701 includes a content 703 to provide information associated with the display 701 as follows:

Provides the date, time and day of the week in the upper right corner of the panel 600.

The UP and DOWN arrow, i.e., icon 7 and icon 9, allow a user to scroll through the following screen choices:
SYSTEM SETUP
SYSTEM CONTROL
MONITOR
WEEKLY SETUP
DAILY SETUP
GAUGES
MAIN MENU
ALARM
LIGHTLOGIX LOGO Once a screen choice is made, selecting the icon 705 will select that highlighted screen choice. Each screen choice is discussed below.

Figure 8:
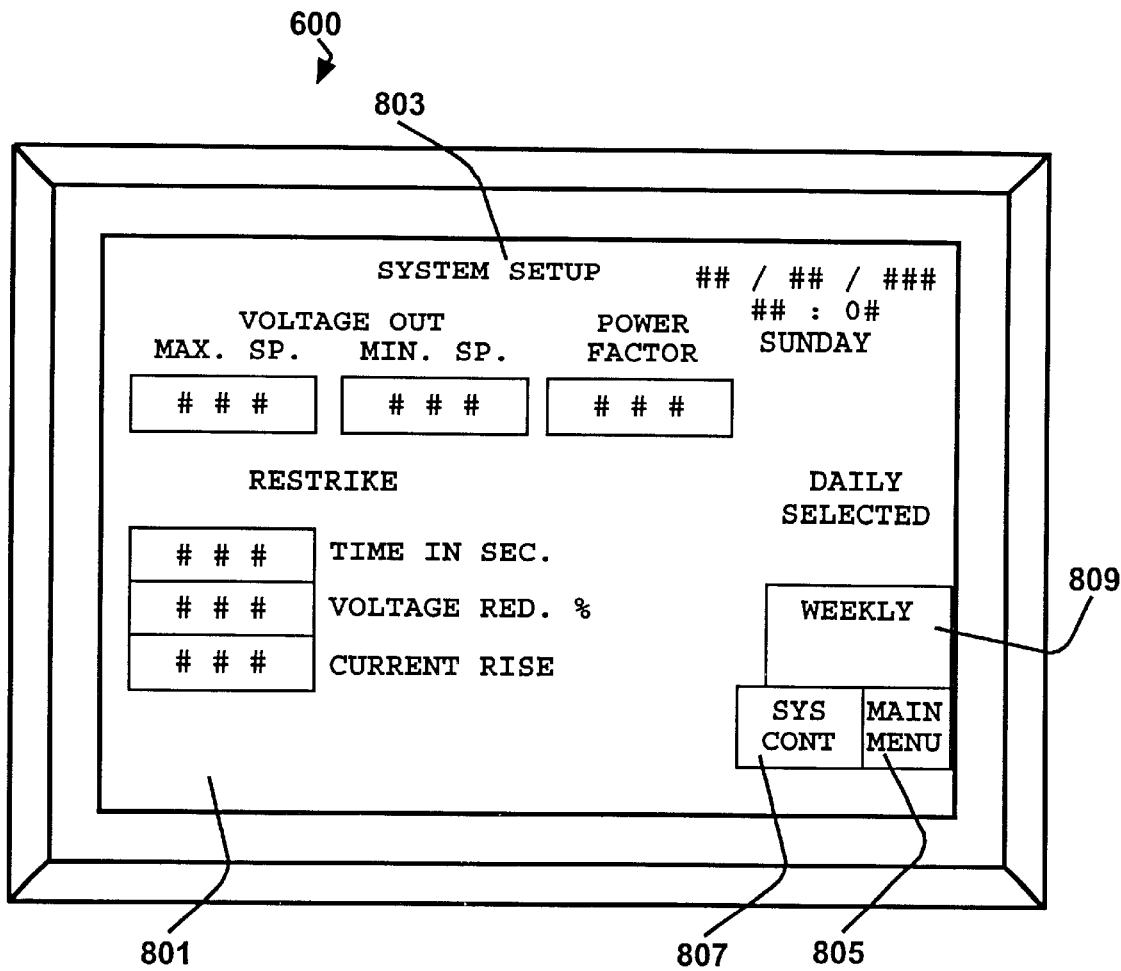

Referring now to FIG. 8, panel 600 shows a display 801 as a System Setup display. The display 801 includes icons 805, 807, and 809 and a content 803 to provide information associated with the display 801 as follows:

Provides the date, time and day of the week in the upper right-hand corner of the display 801;

Allows an operator to enter site specific data;

Maximum voltage setpoint is usually set 3 volts higher than the highest phase reading;

Minimum voltage setpoint is usually set 80 volts below the Maximum setpoint;

Power factor would be measured and entered by user, usually >90%;

Restrike time in seconds is entered to control how long system stays in restrike mode;

Voltage reduction % (percentage) determines the voltage level the lightings restrike at;

Current rise is the amount of increase in current that must be exceeded to enter the restrike mode;

While in Auto mode, operation is based on Daily or Weekly settings. Selection is made by selecting icon 809.

Selecting the icon 807, i.e., "Sys Cont" icon, allows operator to enter date, time and year. And selecting the icon 805 allows operator back to main menu display.

Figure 9:
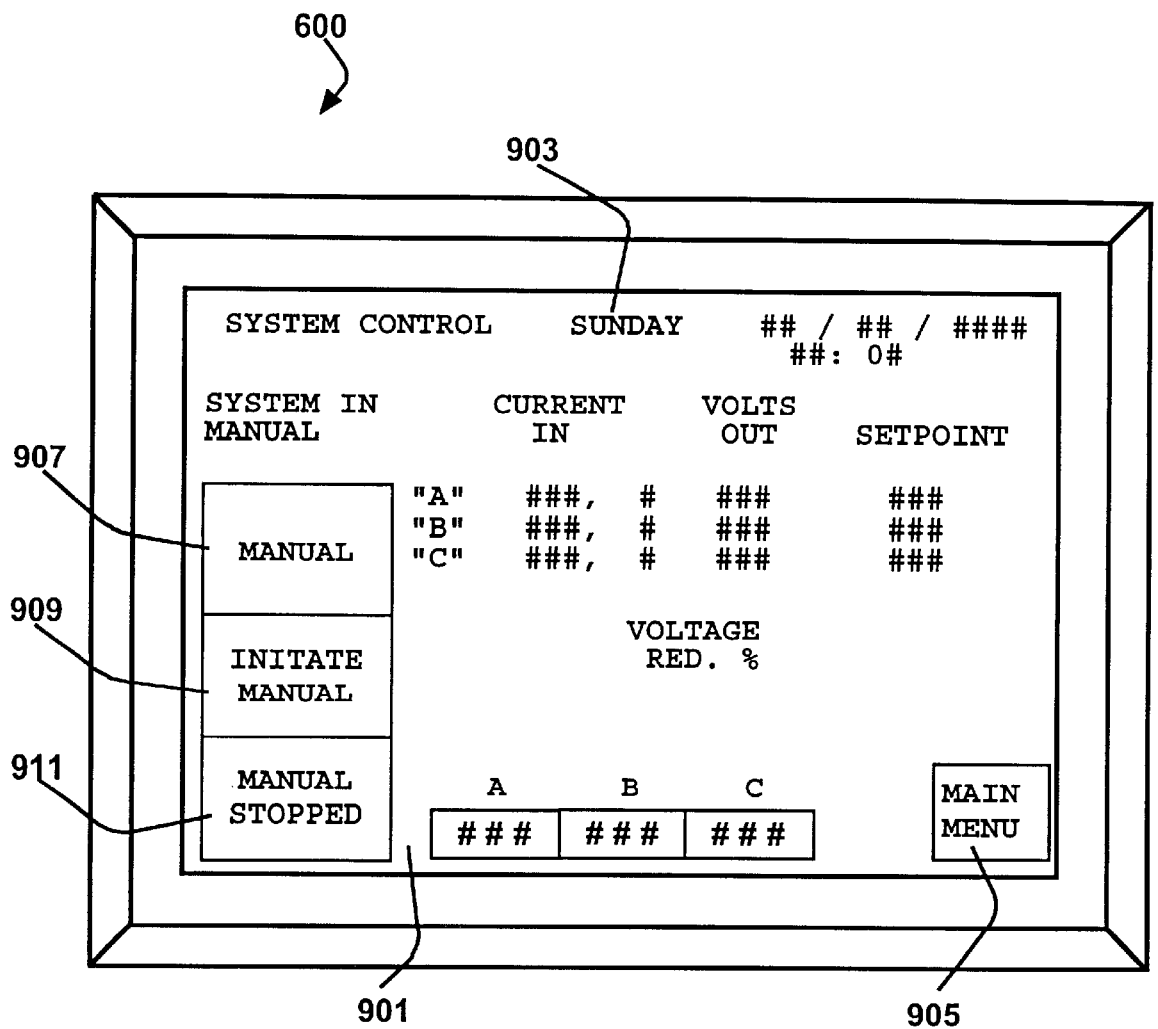

Referring now to FIG. 9, panel 600 shows a display 901 as a System Control display. The display 901 includes icon 905, a content 903 and indications 907, 909 and 911 (showing Manual, Initiate Manual and Manual Stopped, respectively) to provide information associated with the display 901 as follows:

Displays the current state of operation: Manual or Auto, and the current state can be changed by pressing the other state's softkey, i.e., at indication 907;

Displays current "IN" for each phase;

Displays volts out and voltage setpoint for each phase;

Auto refers to daily or weekly settings whichever is selected on system setup screen. Manual refers to voltage reduction percent setpoint at bottom of screen;

Controls the system settings when the unit is in Manual. Whenever manual mode is selected, manual setpoints can be entered. Initiate manual must be selected to make unit go to setpoints. Stop manual will halt the manual adjustments.

Selecting the icon 905 allows operator back to main menu display.

Figure 10:
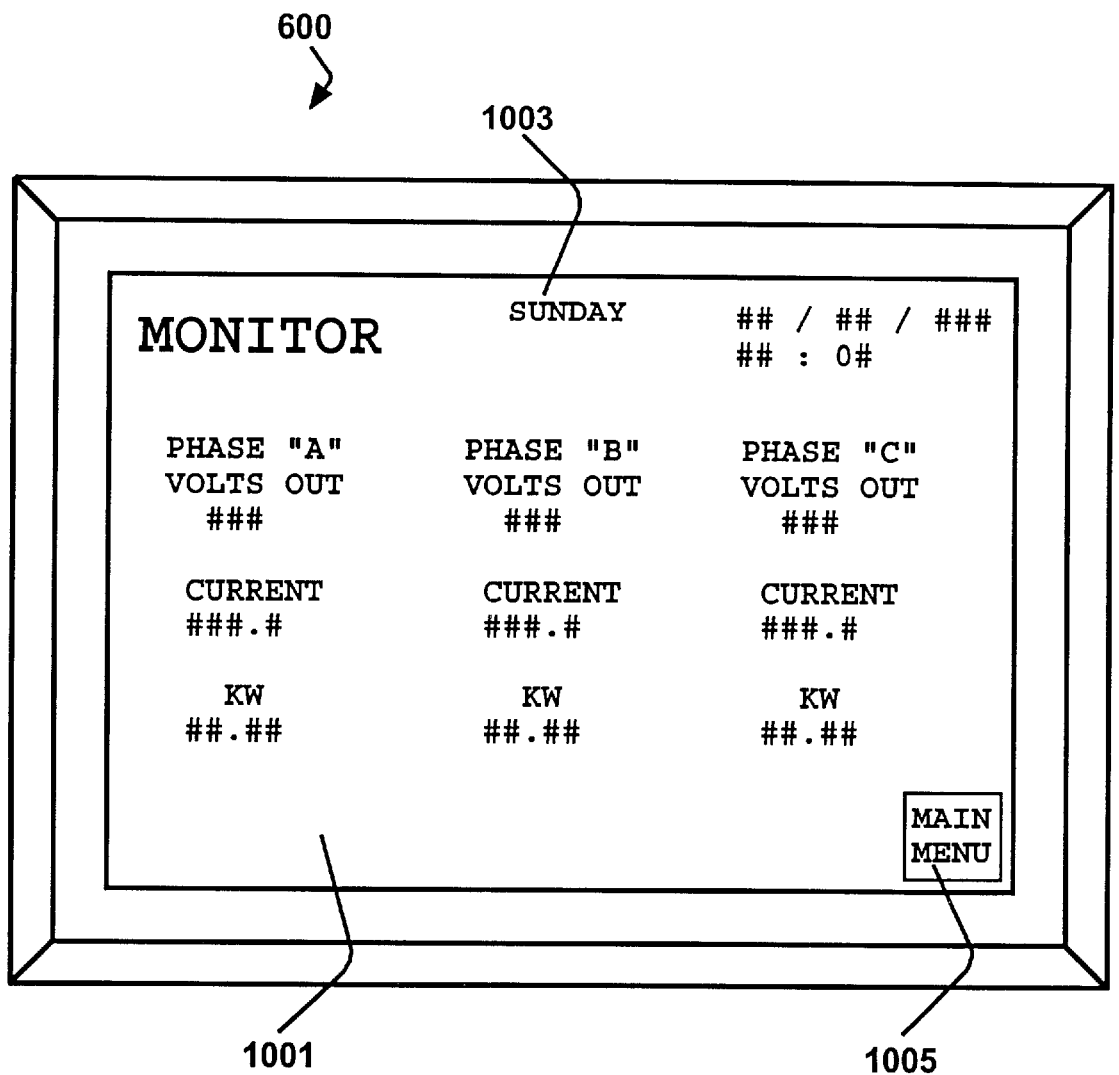

Referring now to FIG. 10, panel 600 shows a display 1001 as a Monitor display. The display 1001 includes icon 1005 and a content 1003 to provide information associated with the display 1001 as follows:

Displays voltage out, current and kilowatts for each phase;

Time, date and day of the week is displayed in upper right corner; and

No changes can be made from this display.

Selecting the icon 1005 allows operator back to main menu display.

Figure 11:
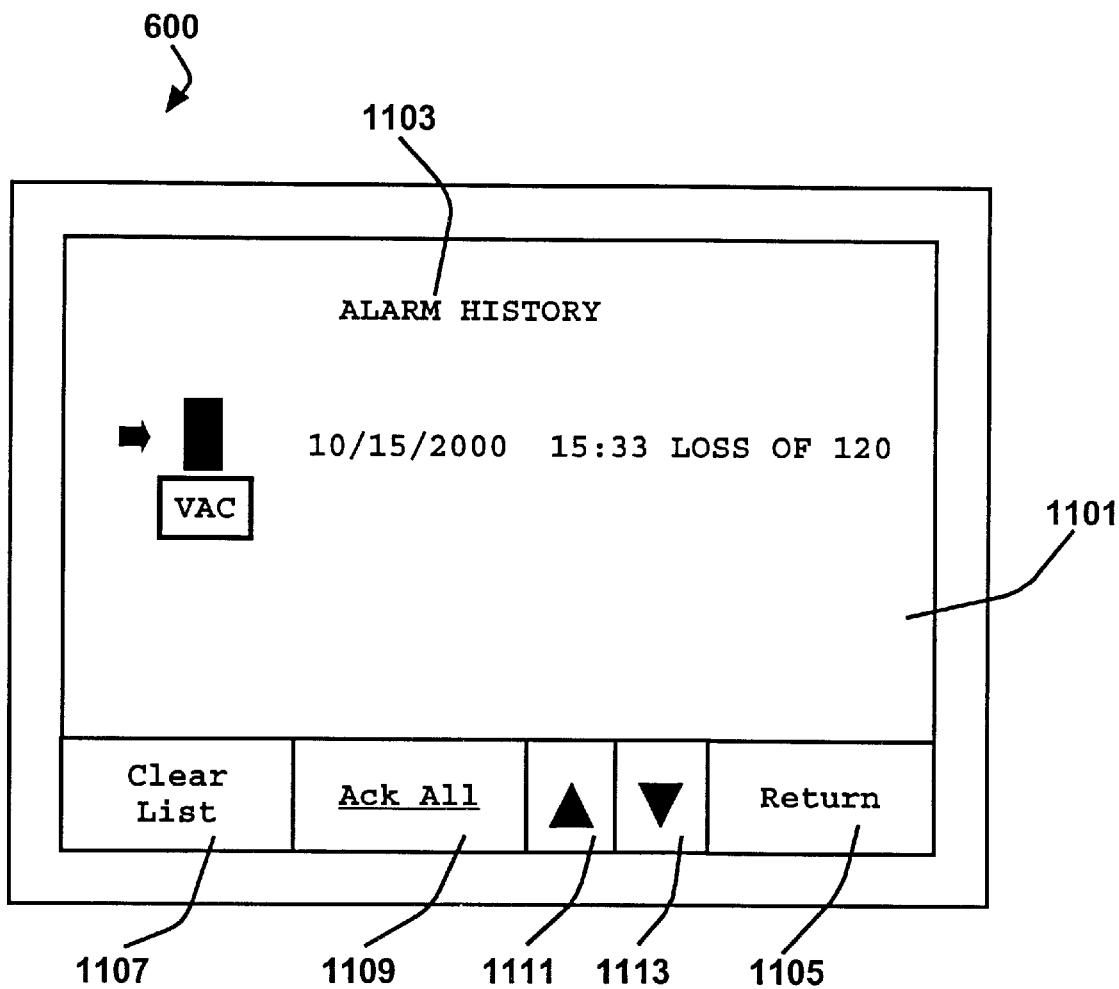

Referring now to FIG. 11, panel 600 shows a display 1101 as an Alarm History display. The display 1101 includes icons 1105, 1107, 1109, 1111 and 1113, and a content 1103 to provide information associated with the display 1101 as follows:

Displays chronological list of all alarms, date, time and type of alarm; and

Softkeys or icons at bottom allow a user to clear (selecting icon 1107), acknowledge (selecting icon 1109) or scroll (selecting icons 1111, 1113) through alarms.

Selecting the icon 1105 allows operator back to main menu display.

An alarm indicates an abnormal condition of the system 100, which needs to be addressed by a user. The system 100 has a variety of alarm capabilities. The following are some of them:

LOSS OF DC—The system 100 will return to full voltage out to the lights. Problem area may be a blown DC fuse or a faulted DC power supply. The PLC 104 and user interface 102 will not operate because they operate off DC power. In one embodiment, the panel 600 has a green light (not shown), a red light (not shown), and an amber light (not shown) indicating Auto mode, Alarm condition, and Bypass mode, respectively. In this alarm condition, the green Auto light, the red Alarm light, and the amber Bypass light will all be off.

LOSS OF 120 VAC—The user interface 102 will display the message "Loss of 120 VAC" and the alarm light will blink. Problem area may be a blown AC fuse, a faulted AC power supply, an analog input card fault, or a loss of phase A (provides 120 Vac through a transformer) or its 150 amp fuse.

SHUNT TRIP—CB1 or CB2 has tripped which causes the shunt contactor 124 to energize. The alarm light will be blinking and the display 600 will display the message "Shunt Trip." The system 100 is sending full voltage out to the lights.

TXFMR A (B, C) TEMP—Message will be displayed on the display 600 and the red Alarm light will blink. Need to check the current loading on the appropriate phase against the machine rating. Need to check the internal temp of the enclosure, check operation of the fan, check air intake, and lower fan thermal switch setting.

PHASE B (C) LOSS—The display 600 will display the alarm message and the red Alarm light will be blinking. The main disconnect fuses could be blown.

TVSS Alarm—Transient Voltage Suppression System 106 is for lightning or voltage spike suppression.

Variable autotransformer 120 overtravel limit switches:

PH A VAR RED TO

PH A VAR INC TO

PH B VAR RED TO

PH B VAR INC TO

PH C VAR RED TO

PH C VAR INC TO

Setpoint Timers

PH A INCR T.O.

PH A DEC T.O.

PH B INCR T.O.

PH B DEC T.O.

PH B INCR T.O.

PH C DEC T.O.

PH C INCR T.O.

The overtravel limit switches prevent the variable autotransformer 120 from traveling beyond its range. The timeout alarm occurs when an output voltage $V_{out}$ in a phase does not reach the voltage setpoint within a specified time period.

Figure 12:
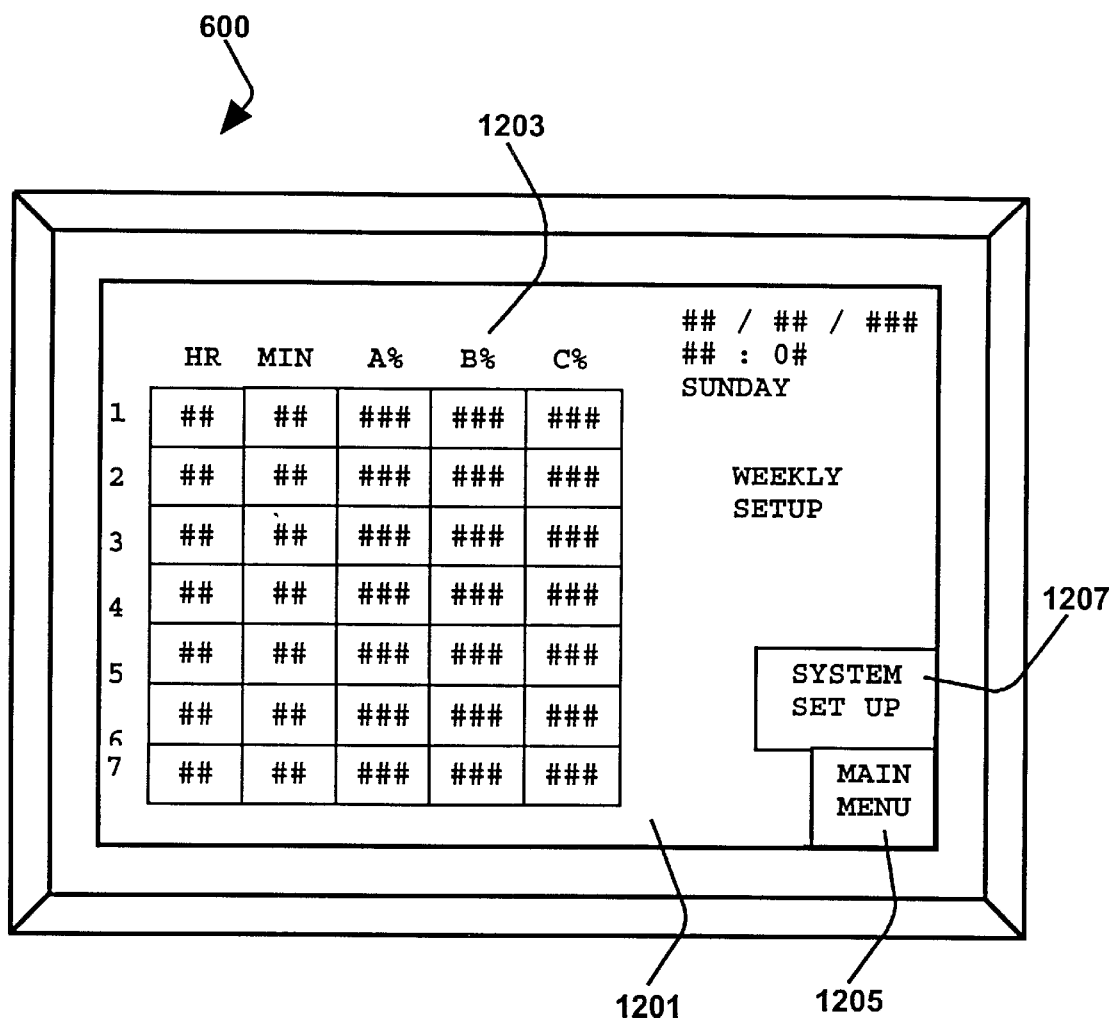

Referring now to FIG. 12, panel 600 shows a display 1201 as a Weekly Setup display. The display 1201 includes icons 1205 and 1207, and a content 1203 to provide information associated with the display 1201 as follows:

When selected, each day of the week will have the same seven settings; and

System setup display can be accessed from here by selecting icon 1207, but password has to be entered.

Selecting the icon 1205 allows operator back to main menu display.

Figure 13:
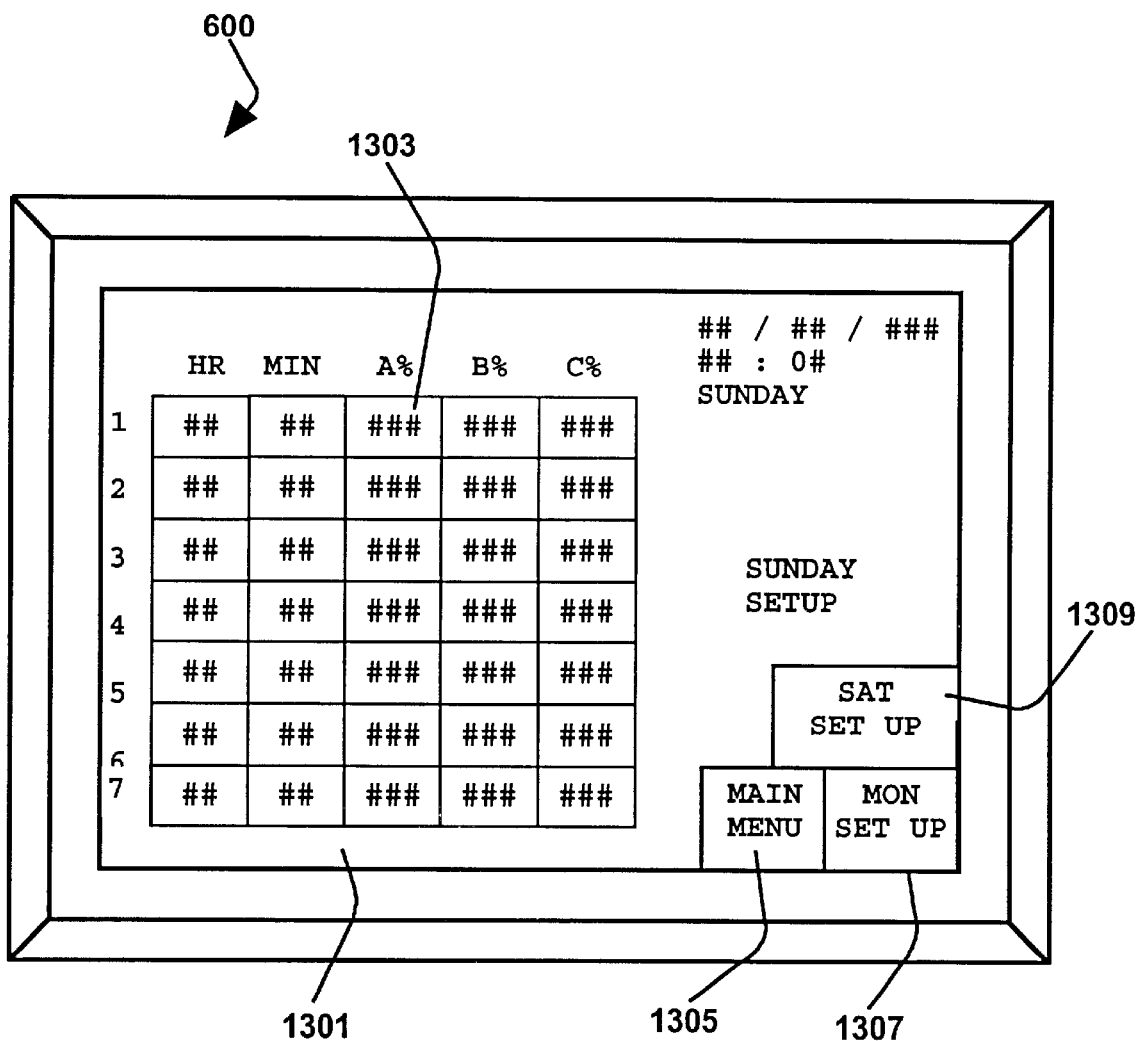

Referring now to FIG. 13, panel 600 shows a display 1301 as a Daily Setup display. The display 1301 includes icons 1305, 1307 and 1309, and a content 1303 to provide information associated with the display 1301 as follows:

Allows seven daily settings to be entered;

Hour, minute and setting for each phase can be customized;

Time, date and day of week is provided in upper right corner of the display 1301;

The programmed day is shown below the current day and time; and

From each daily screen, the preceding day and next day can be selected. For example, display 1301 shows that the programmed day is Sunday. Thus, the preceding day (Saturday) and next day (Monday) can be selected by selecting icons 1309 and 1307, respectively.

Selecting the icon 1305 allows operator back to main menu display.

Figure 14:
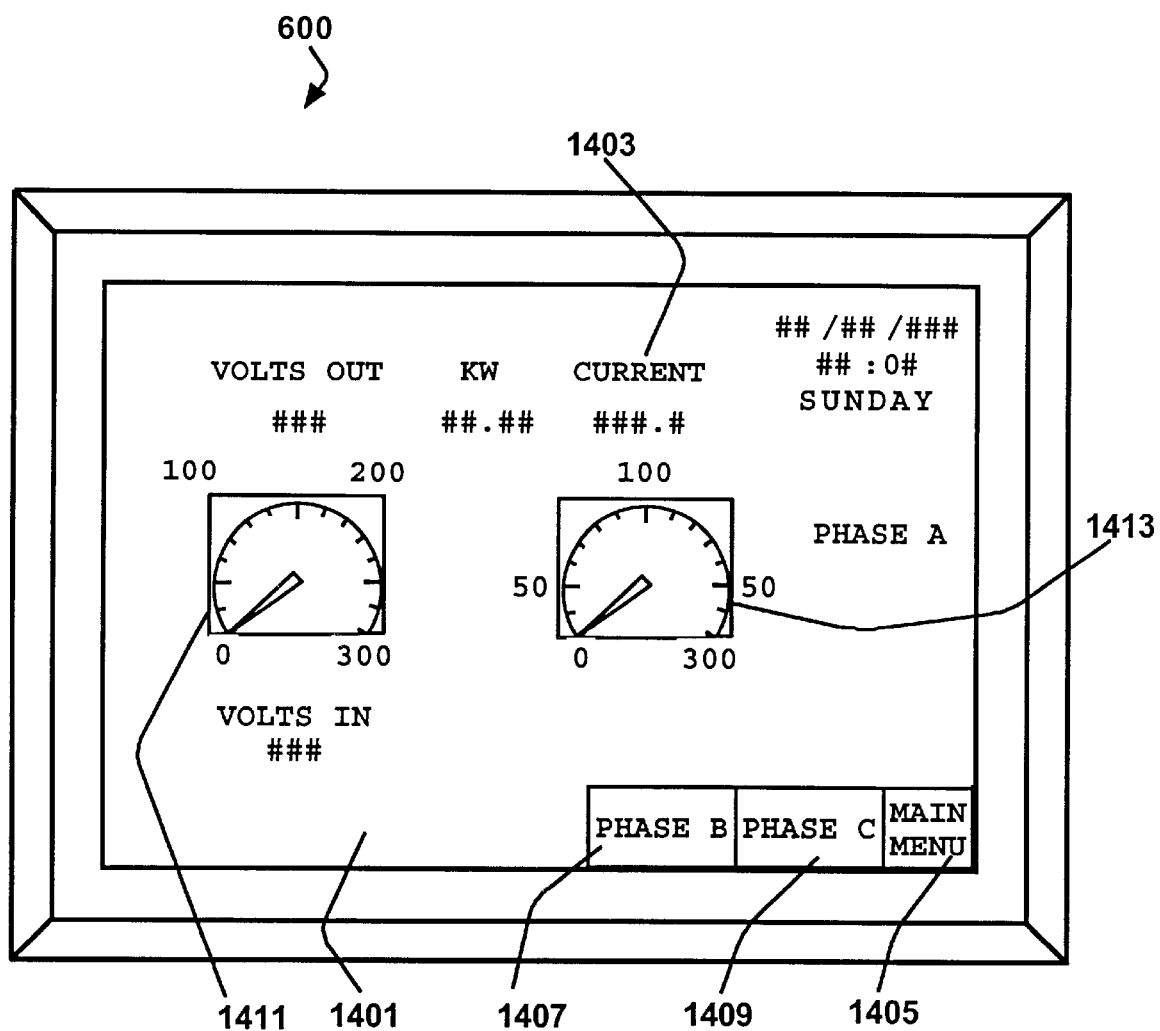

Referring now to FIG. 14, panel 600 shows a display 1401 as a Gauges display. The display 1401 includes icons 1405, 1407 and 1409, and a content 1403 to provide information associated with the display 1401 as follows:

Displays volts out, kW and current for phase indicated on right of the display 1401, which is Phase A as shown;

Volts out and current are also displayed by analog gauges 1411 and 1413, respectively;

Phase A also displays volts in; and

Similar gauge displays for other two phases, here Phase B and Phase C, can be selected by selecting icons 1407 and 1409, respectively. Selecting the icon 1405 allows operator back to main menu display.

The present invention has been applied to different lighting circuits. Table I displays results of application of a power regulating system according to the present invention as shown in FIG. 1 to some metal halide/high pressure sodium lights with input voltage at 286 volts. In Table I, column 1 shows desired voltage reduction setting, where 0% indicates no voltage reduction and 100% indicates full voltage reduction as discussed above. Column 2 gives the output voltage from the system 100 to the lights for each voltage reduction setting. Column 3 gives the corresponding current for each voltage reduction setting. Column 4 gives the voltage total harmonic distortion for each voltage reduction setting. Column 5 gives the corresponding current total harmonic distortion for each voltage reduction setting. Column 6 gives the power factor for each voltage reduction setting. Column 7 gives the power consumption of the lights for each voltage reduction setting. And column 8 gives the power consumption of the lights for each voltage reduction setting in term of percentage in comparison with no power reduction setting. It shows that at 100% voltage reduction setting, the power consumption of the lights is reduced by 29.7%.

TABLE I

Power Consumption of Metal Halide/High Pressure Sodium Lights with Input Voltage at 286 V (First Test)

| Reduction Setting % | V-OUT | I-IN | % V-THD | % I-THD | PF | KW | Power Reduction % KW |
|---|---|---|---|---|---|---|---|
| 0 | 284 | 34.1 | 2.1 | 21.2 | 93 | 9.1 | 0 |
| 10 | 278 | 33.4 | 2 | 20 | 93 | 8.9 | 2.2 |
| 20 | 270 | 32.6 | 2 | 18.9 | 93 | 8.7 | 4.4 |
| 30 | 261 | 31.3 | 2 | 17.8 | 93 | 8.4 | 7.7 |
| 40 | 253 | 30.2 | 2 | 17.2 | 93 | 8.1 | 11 |
| 50 | 245 | 29 | 2 | 16.7 | 94 | 7.8 | 14.3 |
| 60 | 236 | 27.8 | 2 | 16.2 | 94 | 7.5 | 17.6 |
| 70 | 227 | 26.6 | 2 | 15.7 | 94 | 7.2 | 21. |
| 80 | 219 | 25.5 | 2 | 15.3 | 95 | 7. | 23.1 |
| 90 | 210 | 24.2 | 2 | 14.7 | 95 | 6.6 | 27.5 |
| 100 | 202 | 23.1 | 2 | 14.3 | 96 | 6.4 | 29.7 |

Likewise, Table II displays results of application of a power regulating system according to the present invention as shown in FIG. 1 to some metal halide/high pressure sodium lights with input voltage at 286 volts. The data in Table II and Table I were collected independently. Again, as shown in Table II, by utlizing the present invention, at 100% voltage reduction setting, the power consumption of the lights is reduced by 29.6%, which is consistent with the findings shown in Table I.

TABLE II

Power Consumption of Metal Halide/High Pressure Sodium Lights with Input Voltage at 286 V (Second Test)

| Reduction Setting % | V-OUT | I-IN | % V-THD | % I-THD | PF | KW | Power Reduction % KW |
|---|---|---|---|---|---|---|---|
| 0 | 278 | 48.4 | 1.4 | 16.7 | 93 | 13.2 | 0 |
| 10 | 273 | 47.6 | 1.4 | 16.1 | 93 | 12.9 | 2.3 |
| 20 | 266 | 46.2 | 1.4 | 15.5 | 93 | 12.6 | 4.6 |
| 30 | 258 | 44.6 | 1.5 | 15 | 93 | 12.1 | 8.4 |
| 40 | 250 | 43.1 | 1.5 | 14.5 | 93 | 11.7 | 11.4 |
| 50 | 242 | 41.5 | 1.5 | 14.2 | 94 | 11.3 | 14.4 |
| 60 | 234 | 39.9 | 1.5 | 13.8 | 94 | 10.9 | 17.5 |
| 70 | 226 | 38.2 | 1.55 | 13.6 | 94 | 10.4 | 21.2 |
| 80 | 221 | 37 | 1.6 | 13.3 | 95 | 10.1 | 23.5 |
| 90 | 213 | 35.4 | 1.55 | 12.9 | 95 | 9.7 | 26.6 |
| 100 | 205 | 33.9 | 1.55 | 12.8 | 96 | 9.3 | 29.6 |

The present invention further includes a computer program product in a computer readable medium of instructions. Referring now back to FIG. 1, the computer program product has instructions within the computer readable medium for operating a controller 104 that is in communication with an user interface 102 and a first transformer 120 coupled to a power path 105 for receiving an input voltage at an input node 101 of the first transformer 120. Additionally, the computer program product has instructions within the computer readable medium for permitting input to the controller 104 by a user to generate a control signal responsive to the input. Moreover, the computer program product has instructions within the computer readable medium for applying the control signal to the first transformer 120 so that the first transformer 120 generates a control voltage corresponding to the input at an output node of the first transformer 120, wherein the first transformer 120 is electrically coupled with a second transformer 118 coupled to the power path 105 and having a primary coil coupled to the output node of the first transformer 120 and a secondary coil so that when the control voltage is applied to the primary coil of the second transformer 118, the secondary coil of the second transformer 118 generates an output voltage that is substantially 180° out of phase from the input voltage.

Additionally, the computer program product has instructions within the computer readable medium for programming the controller 118 responsive to user inputs.

Moreover, the computer program product has instructions within the computer readable medium for monitoring operation along the power path 105 and generating operation data in the controller 118.

Furthermore, the computer program product has instructions within the computer readable medium for displaying the operation data in the user interface 102.

As those skilled in the art will appreciate, while the present invention has been described in the context of a fully functional power management system having a controller, the mechanism of the present invention is capable of being distributed in the form of a computer readable medium of instructions in a variety of forms to control other types of power regulation devices, and the present invention applies equally regardless of the particular type of signal bearing media used to actually carry out the distribution. Examples of computer readable media include: memory devices, chips, recordable type media such as floppy disks and CD-ROMs and transmission type media such as digital and analog communication links.

The above described embodiments are given as an illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A power regulation system coupled to an input node for receiving an input voltage and coupled to an output node for outputting an output voltage, comprising:
    a. a first power path electrically coupling the input node and the output node to allow a current to flow therethrough;
    b. a power block electrically coupled to the first power path and between the input node and the output node for regulating the current to flow therethrough the power block comprising:
        i. a first transformer electrically coupled in parallel with the first power path, the first transformer having an input node and an output node; and
        ii. a second transformer electrically coupled in series with the first power path, the second transformer having a primary coil and a secondary coil with reversed polarities, wherein the input node of the first transformer is electrically coupled to the first power path for receiving the input voltage and the output node of the first transformer is electrically coupled to the primary coil of the second transformer for providing a control voltage to cause the secondary coil of the second transformer to generate an output voltage;
    c. a control block electrically coupled to the first power path and in control communication with the power block for providing operating current and setting a control voltage for the power block, the control block comprising a controller in control communication with the first transformer of the power block for setting the control voltage at a selected voltage; and
    d. a safety block electrically coupled to the first power path, the power block and the control block for providing surge protection, the safety block comprising:
        i. a transient voltage suppression system electrically connected to the input node and positioned between the input node and the power block; and
        ii. a shunt contactor electrically coupled across the primary coil of the second transformer of the power block.

2. The system of claim 1, wherein the first transformer of the power block comprises:
    i. a winding having a first end and a second end, wherein the first end is electrically coupled to the input node and the second end is electrically coupled to neutral to receive the input voltage; and
    ii. a movable wiper arm having a wiper, an output node and a body therebetween, wherein the movable wiper arm is movable continuously between the second end and the first end of the winding so that a control voltage is generated between the output node and the second end within a range of from 0 volts to at least the input voltage.

3. The system of claim 2, wherein the power block further comprises:
    a. a driver engaging the movable wiper arm through the body of the movable wiper arm; and
    b. the controller, in control communication with the driver, causing the driver to move the movable wiper arm to a selected position between the second end and the first end of the winding, so that a control voltage with a selected value is generated between the output node and the second end of the winding.

4. The system of claim 3, wherein the first transformer is a variable autotransformer having a capacity of output voltage ranging from 0 volts to approximately 220% of the input voltage.

5. The system of claim 1, wherein the second transformer is a buck transformer.

6. The system of claim 5, wherein the buck transformer is a torroidal transformer.

7. The system of claim 6, wherein the torroidal transformer has a ratio of 4:1 (four to one) for the winding of the primary coil to the winding of the secondary coil.

8. The system of claim 1, wherein the controller is programmable.

9. The system of claim 8, wherein the controller comprises a digital processor.

10. The system of claim 8, wherein the controller comprises an analog processor.

11. The system of claim 1, wherein the control block further comprises a user interface in communication with the controller.

12. The system of claim 11, wherein the user interface comprises a touchscreen having a plurality of settings, each setting including icons, each corresponding to a control signal that is communicated to the controller to cause the system to perform a predetermined operation, and displays, each displaying information associated with the operation of the system.

13. The system of claim 11, wherein the user interface is adapted to receive an input from a user and generate a control signal that is communicated to the controller to cause the system to perform a predetermined operation and to display to the user information associated with the operation of the system.

14. The system of claim 1, wherein the control block further comprises a current transducer electrically coupled between the first power path and the controller for feeding current signal to the controller for monitoring the current passing through the first power path.

15. The system of claim 14, wherein the current transducer is a multi-channel current transducer, each channel being capable of monitoring current in a phase independently.

16. The system of claim 1, wherein the control block further comprises an input voltage transducer electrically coupled between the first power path and the controller and positioned between the input node and the power block for feeding input voltage signal to the controller for monitoring the input voltage applied to the power block.

17. The system of claim 1, wherein the control block further comprises an output voltage transducer electrically coupled between the first power path and the controller and positioned between the power block and the output node for feeding output voltage signal to the controller for monitoring the output voltage.

18. The system of claim 17, wherein the output voltage transducer is a multi-channel output voltage transducer, each channel being capable of monitoring voltage in a phase independently.

19. The system of claim 1, wherein the control block further comprises a first power supply device electrically coupled to the first power path for changing the input voltage to an AC voltage with a predetermined amplitude.

20. The system of claim 19, wherein the first power supply device comprises a transformer having a primary coil and a secondary coil, the primary coil being electrically coupled to the first power path for receiving the input voltage and the secondary coil outputting an AC voltage with a predetermined amplitude of substantially around 120 volts.

21. The system of claim 20, wherein the control block further comprises a second power supply device electrically coupled to the secondary coil of the first power supply device for changing the AC voltage with a predetermined amplitude of substantially around 120 volts to a DC voltage with a predetermined amplitude.

22. The system of claim 21, wherein the second power supply device comprises a transformer having a primary coil and a secondary coil, the primary coil being electrically coupled to the secondary coil of the first power supply device for receiving an AC voltage with a predetermined amplitude of substantially around 120 volts and the secondary coil outputting a DC voltage with a predetermined amplitude of substantially around 24 volts.

23. The system of claim 1, wherein the safety block further comprises a first circuit breaker electrically coupled between the first power path and the input node of the first transformer of the power block.

24. The system of claim 23, wherein the safety block further comprises a second circuit breaker electrically coupled between the output node of the first transformer of the power block and the primary coil of the second transformer of the power block.

25. The system of claim 1, wherein the safety block further comprises a relay device electrically coupled between the first transformer of the power block and the controller of the control block for receiving a DC signal from the controller during a normal operation of the system and providing an AC voltage to the first transformer of the power block during an abnormal operation of the system.

26. The system of claim 1, wherein the safety block further comprises a fusing device positioned on the first power path between the input node and the power block, the fusing device having a threshold of current at which the fusing device disconnects the system from the input node.

27. The system of claim 1, further comprising a second power path electrically coupling the input node and the output node, wherein the second power path is in parallel with the first power path.

28. The system of claim 27, wherein the safety block further comprises a switch operatively coupled to the first power path and the second power path for selectively allowing the current to flow therethrough one of the first power path and the second power path.

29. The system of claim 28, wherein the switch includes a switch having a first, a second and a third operative positions:
when the switch is selected to be on the first operative position corresponding to a first operation mode of the system, the switch allows the current to flow therethrough the first power path, the power block and the switch so that an output voltage different from the input voltage is generated between the output node and neutral;

when the switch is selected to be on the second operative position corresponding to a second operation mode of the system, the switch allows the current to flow therethrough the second power path and the switch so that an output voltage substantially identical to the input voltage is generated between the output node and neutral; and when the switch is selected to be on the third operative position corresponding to a third operation mode of the system, the switch disallows the current to flow therethrough either of the first power path and the second power path so that no output voltage is generated between the output node and neutral.

30. A power regulation system coupled to a three-phase AC power source, each phase providing an input voltage related to neutral, respectively, comprising: on each phase,
   a. a first transformer, comprising:
      i. a winding having a first end and a second end electrically coupled to the phase and neutral, respectively, to receive the input voltage from the phase; and
      ii. a movable wiper arm having a wiper, an output node and a body therebetween, wherein the movable wiper arm is movable continuously between the second end and the first end of the winding so that a control voltage is generated between the output node and the second end within a range of from 0 volts to at least the input voltage; and
   b. a second transformer, comprising:
      i. a primary coil having a first end and a second end, wherein the first end is electrically coupled to the output node and the second end is electrically coupled to neutral to receive the control voltage from the first transformer; and
      ii. a secondary coil having a first end and a second end, wherein the first end is electrically coupled to the phase;
   c. a first circuit breaker electrically coupled between the phase and the first end of the winding of the first transformer;
   d. a second circuit breaker electrically coupled between the output node of the first transformer and the primary coil of the second transformer; and
   e. a shunt contactor electrically coupled across the primary coil of the second transformer,
wherein the first circuit breaker and the second circuit breaker are in parallel to each other and in series with the shunt contactor;
wherein the primary coil and secondary coil are electromagnetically coupled to each other and so arranged that when the control voltage from the first transformer is applied to the first end and the second end of the primary coil, an output voltage is generated between the first end and the second end of the secondary coil;
wherein the output voltage is substantially 180° out of phase from the input voltage so as to generate between the first end of the secondary coil and neutral an effective voltage that is less than the input voltage and substantially equals to the difference between the input voltage and the output voltage.

31. The system of claim 30, further comprising, on each phase, at least one load having a first terminal and a second terminal, wherein the first terminal is electrically coupled to the second end of the second transformer on the phase and the second terminal is electrically coupled to neutral to receive the effective voltage and generate a reduced power consumption.

* * * * *